US012748945B2

(12) United States Patent
Li et al.

(10) Patent No.: US 12,748,945 B2
(45) Date of Patent: Sep. 29, 2026

(54) SYSTEMS AND METHODS FOR A FULL-STACK OBFUSCATION FRAMEWORK TO MITIGATE NEURAL NETWORK ARCHITECTURE THEFT

(71) Applicants: Jingtao Li, Tempe, AZ (US); Chaitali Chakrabarti, Tempe, AZ (US); Deliang Fan, Tempe, AZ (US); Adnan Siraj Rakin, Tempe, AZ (US)

(72) Inventors: Jingtao Li, Tempe, AZ (US); Chaitali Chakrabarti, Tempe, AZ (US); Deliang Fan, Tempe, AZ (US); Adnan Siraj Rakin, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 657 days.

(21) Appl. No.: 18/208,027

(22) Filed: Jun. 9, 2023

(65) Prior Publication Data

US 2023/0401422 A1 Dec. 14, 2023

Related U.S. Application Data

(60) Provisional application No. 63/350,765, filed on Jun. 9, 2022.

(51) Int. Cl.
*G06N 3/04* (2023.01)

(52) U.S. Cl.
CPC .................................... *G06N 3/04* (2013.01)

(58) Field of Classification Search
CPC ........ G06N 3/04; G06N 3/048; G06N 3/0464; G06N 3/126; G06N 5/01; G06N 3/0442; G06F 21/14
See application file for complete search history.

(56) References Cited

U.S. PATENT DOCUMENTS

2022/0197981 A1* 6/2022 Marson .................... G06N 3/02
2026/0017386 A1* 1/2026 Ohayon ................ G06F 21/577

OTHER PUBLICATIONS

Y. Luo, S. Duan, C. Gongye, Y. Fei and X. Xu, "NNReArch: A Tensor Program Scheduling Framework Against Neural Network Architecture Reverse Engineering," 2022 (Year: 2022).*

(Continued)

*Primary Examiner* — Dylan M Katz
(74) *Attorney, Agent, or Firm* — Polsinelli PC

(57) ABSTRACT

A full-stack neural network obfuscation framework obfuscates a neural network architecture while preserving its functionality with very limited performance overhead. The framework includes obfuscating parameters or "knobs", including layer branching, layer widening, selective fusion and schedule pruning, that increase the number of operators, reduce/increase the latency, and number of cache and DRAM accesses. In addition, a genetic algorithm-based approach is adopted to orchestrate the combination of obfuscating knobs to achieve the best obfuscating effect on the layer sequence and dimension parameters so that the architecture information cannot be successfully extracted.

16 Claims, 18 Drawing Sheets

(56) References Cited

OTHER PUBLICATIONS

X. Hu, L. Liang, S. Li, L. Deng, P. Zuo, Y. Ji, X. Xie, Y. Ding, C. Liu, T. Sherwood et al., "Deepsniffer: A dnn model extraction framework based on learning architectural hints," in Proceedings of the Twenty-Fifth International Conference on Architectural Support for Programming Languages and Operating Systems, 2020, pp. 385-399.

J. Wei, Y. Zhang, Z. Zhou, Z. Li, and M. A. Al Faruque, "Leaky dnn: Stealing deep-learning model secret with gpu context-switching side-channel," in 2020 50th Annual IEEE/IFIP International Conference on Dependable Systems and Networks (DSN). IEEE, 2020, pp. 125-137.

V. Duddu, D. Samanta, D. V. Rao, and V. E. Balas, "Stealing neural networks via timing side channels," arXiv preprint arXiv:1812.11720, 2018.

S. Liu, Y. Wei, J. Chi, F. H. Shezan, and Y. Tian, "Side channel attacks in computation offloading systems with gpu virtualization," in 2019 IEEE Security and Privacy Workshops (SPW). IEEE, 2019, pp. 156-161.

H. Sak, A. Senior, and F. Beaufays, "Long short-term memory recurrent neural network architectures for large scale acoustic modeling," in Fifteenth Annual Conference of the International Speech Communication Association, 2014.

F. Tramer, F. Zhang, A. Juels, M. K. Reiter, and T. Ristenpart, "Stealing machine learning models via prediction apis," in 25th {USENIX} Security Symposium ({USENIX} Security 16), 2016, pp. 601-618.

B. Wang and N. Z. Gong, "Stealing hyperparameters in machine learning," in 2018 IEEE Symposium on Security and Privacy (SP). IEEE, 2018, pp. 36-52.

C. Liu, A. Harris, M. Maas, M. Hicks, M. Tiwari, and E. Shi, "Ghostrider: A hardware-software system for memory trace oblivious computation," ACM SIGPLAN Notices, vol. 50, No. 4, pp. 87-101,2015.

E. Stefanov, M. Van Dijk, E. Shi, C. Fletcher, L. Ren, X. Yu, and S. Devadas, "Path oram: an extremely simple oblivious ram protocol," in Proceedings of the 2013 ACM SIGSAC conference on Computer & communications security, 2013, pp. 299-310.

E. Karimi, Y. Fei, and D. Kaeli, "Hardware/software obfuscation against timing side-channel attack on a gpu," in 2020 IEEE International Symposium on Hardware Oriented Security and Trust (HOST). IEEE, 2020, pp. 122-131.

Q. Xu, H. Naghibijouybari, S. Wang, N. Abu-Ghazaleh, and M. An-navaram, "Gpuguard: mitigating contention based side and covert channel attacks on gpus," in Proceedings of the ACM International Conference on Supercomputing, 2019, pp. 497-509.

T. Chen, T. Moreau, Z. Jiang, L. Zheng, E. Yan, H. Shen, M. Cowan, L. Wang, Y. Hu, L. Ceze et al., "{TVM}: An automated end-to-end optimizing compiler for deep learning," in 13th {USENIX} Symposium on Operating Systems Design and Implementation ({OSDI} 18), 2018, pp. 578-594.

G. Navarro, "A guided tour to approximate string matching," ACM computing surveys (CSUR), vol. 33, No. 1, pp. 31-88,2001.

T. Chen, L. Zheng, E. Yan, Z. Jiang, T. Moreau, L. Ceze, C. Guestrin, and A. Krishnamurthy, "Learning to optimize tensor programs," arXiv preprint arXiv:1805.08166, 2018.

T. Chen and C. Guestrin, "Xgboost: A scalable tree boosting system," in Proceedings of the 22nd acm sigkdd international conference on knowledge discovery and data mining, 2016, pp. 785-794.

H. Yu, H. Ma, K. Yang, Y. Zhao, and Y. Jin, "Deepem: Deep neural networks model recovery through em side-channel information leakage," in 2020 IEEE International Symposium on Hardware Oriented Security and Trust (HOST). IEEE, 2020, pp. 209-218.

X. Hu, L. Liang, L. Deng, S. Li, X. Xie, Y. Ji, Y. Ding, C. Liu, T. Sherwood, and Y. Xie, "Neural network model extraction attacks in edge devices by hearing architectural hints," arXiv preprint arXiv:1903.03916, 2019.

H. Naghibijouybari, A. Neupane, Z. Qian, and N. Abu-Ghazaleh, "Rendered insecure: Gpu side channel attacks are practical," in Proceedings of the 2018 ACM SIGSAC Conference on Computer and Communications Security, 2018, pp. 2139-2153.

H. Zhu, Z. An, C. Yang, K. Xu, E. Zhao, and Y. Xu, "Eena: efficient evolution of neural architecture," in Proceedings of the IEEE/CVF International Conference on Computer Vision Workshops, 2019, pp. 0-0.

T. Chen, I. Goodfellow, and J. Shlens, "Net2net: Accelerating learning via knowledge transfer," arXiv preprint arXiv:1511.05641, 2015.

M. Wistuba, "Deep learning architecture search by neuro-cell-based evolution with function-preserving mutations," in Joint European Conference on Machine Learning and Knowledge Discovery in Databases. Springer, 2018, pp. 243-258.

L. Breiman, "Bagging predictors," Machine learning, vol. 24, No. 2, pp. 123-140,1996.

K. Simonyan and A. Zisserman, "Very deep convolutional networks for large-scale image recognition," arXiv preprint arXiv:1409.1556, 2014.

K. He, X. Zhang, S. Ren, and J. Sun, "Deep residual learning for image recognition," in Proceedings of the IEEE conference on computer vision and pattern recognition, 2016, pp. 770-778.

A. G. Howard, M. Zhu, B. Chen, D. Kalenichenko, W. Wang, T. Weyand, M. Andreetto, and H. Adam, "Mobilenets: Efficient convolutional neural networks for mobile vision applications," arXiv preprint arXiv:1704.04861, 2017.

I. J. Goodfellow, J. Shlens, and C. Szegedy, "Explaining and harnessing adversarial examples," arXiv preprint arXiv:1412.6572, 2014.

A. Madry, A. Makelov, L. Schmidt, D. Tsipras, and A. Vladu, "Towards deep learning models resistant to adversarial attacks," arXiv preprint arXiv:1706.06083, 2017.

J. Li, Z. He, A. S. Rakin, D. Fan and C. Chakrabarti, "NeurObfuscator: A Full-stack Obfuscation Tool to Mitigate Neural Architecture Stealing," 2021 IEEE International Symposium on Hardware Oriented Security and Trust (HOST), Tysons Corner, VA, USA, 2021, pp. 248-258, doi: 10.1109/HOST49136.2021.9702279.

* cited by examiner

10

100

(b)

DER

| C1 \ C2 | 3 | 5 | 7 | 9 |
|---|---|---|---|---|
| 3 | 0.00 | 4.08 | 3.27 | 5.17 |
| 5 | 0.88 | 4.97 | 4.13 | 6.11 |
| 7 | 2.16 | 6.20 | 5.47 | 7.62 |
| 9 | 0.95 | 5.07 | 3.75 | 6.55 |

Latency

| C1 \ C2 | 3 | 5 | 7 | 9 |
|---|---|---|---|---|
| 3 | 1.00 | 3.89 | 5.50 | 15.66 |
| 5 | 1.05 | 3.93 | 5.54 | 15.71 |
| 7 | 1.30 | 4.19 | 5.79 | 15.97 |
| 9 | 1.61 | 4.49 | 6.13 | 16.28 |

FIG. 15B (a)

DER

| C1 \ C2 | 1 | 1.125 | 1.25 | 1.375 | 1.5 |
|---|---|---|---|---|---|
| 1 | 0.00 | 0.18 | 1.70 | 1.06 | 1.88 |
| 1.125 | 0.27 | 2.00 | 1.30 | 1.97 | 2.45 |
| 1.25 | 1.20 | 2.20 | 4.45 | 2.66 | 4.01 |
| 1.375 | 1.48 | 0.27 | 0.63 | 2.05 | 3.59 |
| 1.5 | 1.09 | 0.98 | 3.79 | 2.52 | 2.85 |

Latency

| C1 \ C2 | 1 | 1.125 | 1.25 | 1.375 | 1.5 |
|---|---|---|---|---|---|
| 1 | 1.00 | 1.40 | 1.41 | 1.52 | 1.53 |
| 1.125 | 1.03 | 1.36 | 1.36 | 1.80 | 1.65 |
| 1.25 | 1.04 | 1.35 | 1.39 | 1.62 | 1.70 |
| 1.375 | 1.21 | 1.38 | 1.35 | 1.78 | 1.56 |
| 1.5 | 1.31 | 1.72 | 1.43 | 1.80 | 1.89 |

FIG. 15C (c)

| Degree (C1) | 0 | 1 | 2 | 3 | 5 | 10 | 20 |
| --- | --- | --- | --- | --- | --- | --- | --- |
| DER | 0.00 | 0.17 | 0.42 | 0.10 | 0.12 | 0.16 | 0.62 |
| Latency | 1.00 | 1.02 | 1.04 | 1.05 | 1.10 | 1.19 | 1.98 |

(d)

SYSTEMS AND METHODS FOR A FULL-STACK OBFUSCATION FRAMEWORK TO MITIGATE NEURAL NETWORK ARCHITECTURE THEFT

CROSS REFERENCE TO RELATED APPLICATIONS

The present document is a non-provisional patent application that claims benefit to U.S. provisional application Ser. No. 63/350,765 filed on Jun. 9, 2022; all of which is incorporated by reference in its entirety.

FIELD

The present disclosure generally relates to neural network security, and in particular, to a system and associated method for a full-stack neural network obfuscation tool to mitigate neural architecture theft.

BACKGROUND

The architecture information of a Deep Neural Network (DNN) model is very sensitive and should never be exposed. It is a valuable Intellectual Property (IP) that costs companies lots of time and resources. Knowledge of the exact architecture allows an adversary to build a more precise substitute model and use the model to launch devastating adversarial attacks. For instance, it is shown that accurate architecture information enables the adversary to improve the attack success rate of input adversarial attack by almost 3 times.

It is with these observations in mind, among others, that various aspects of the present disclosure were conceived and developed.

BRIEF DESCRIPTION OF THE DRAWINGS

FIG. 15B is a graphical representation showing application of layer widening to C1/C2 by the framework of FIG. 8;

FIG. 15C is a graphical representation showing application of kernel widening to C1/C2 by the framework of FIG. 8;

Corresponding reference characters indicate corresponding elements among the view of the drawings. The headings used in the figures do not limit the scope of the claims.

DETAILED DESCRIPTION

I. Introduction

Figure 1:
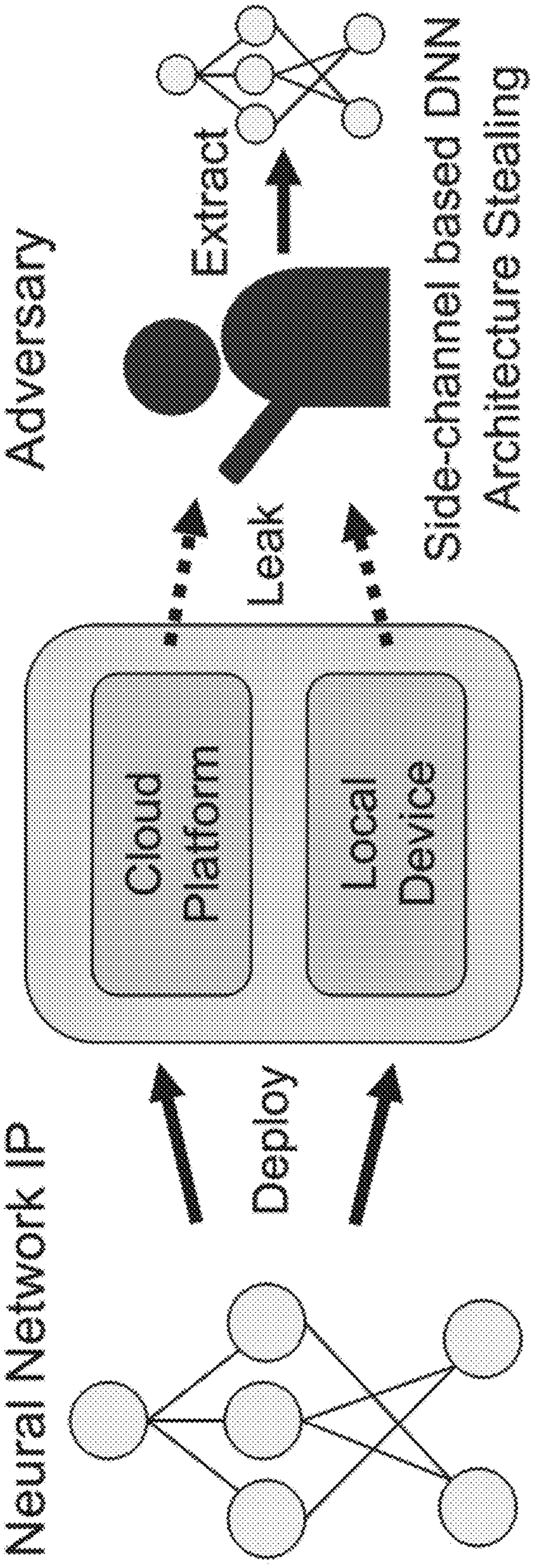
FIG. 1 is a simplified diagram showing an example of side-channel based deep neural network architecture theft.

Side-channel based deep-neural network (DNN) architecture theft has been reported in several prior works. An outsider can extract the DNN architecture through side-channel information leakage, as shown in FIG. 1. Specifically, when an owner of a neural network IP hosts an application on a third-party cloud computing platform or on a local device with GPU support, the neural network IP is vulnerable to architecture stealing through side-channel attacks. A typical architecture stealing flow includes profiling a target device, training a sequence predictor (e.g., LSTM), predicting a layer sequence of a target DNN model based on run-time traces of the target DNN model, and then extracting dimension parameters of each layer within the target DNN model. This is quite different from stealing through Machine-Learning-as-a-Service (MLaaS), where the attacker can query the model and retrieve the confidence score.

Previous efforts on preventing DNN architecture stealing have focused on hardware to eliminate information leakage. Oblivious Random Access Memory (ORAM) technology prevents memory access leakage by encrypting the memory address. Miss Status Holding Registers (MSHR) were redesigned in one prior art example to obfuscate GPU memory access and add a layer of randomness. Though hardware modifications are effective countermeasures, they are not beneficial to existing devices and have high performance overhead. Recently, one such prior work includes a decision tree-based detection method against spy applications on GPU. However, it suffers from high false positive rate and is not practical. Tensor Virtual Machine (TVM) has also been proposed as a potential countermeasure. Nevertheless, as shown by experiments reported herein (FIG. 6), standard TVM does not show enough randomness to be an effective countermeasure.

The present disclosure provides a framework 100 (FIG. 8) for neural network obfuscation (e.g., NeurObfuscator), a full-stack tool which obfuscates neural network execution to effectively mitigate neural architecture stealing. The framework 100 includes 8 obfuscating knobs for two types of obfuscation: (i) sequence obfuscation which obfuscates the layer depth, and types and connection topologies between layers, and (ii) dimension obfuscation which obfuscates the dimension parameters of each layer, including the number of input and output channels, weight kernel size, etc. Function-preserving knobs such as layer branching, layer deepening, layer skipping followed by selective fusion in TVM-based graph optimization are used for sequence obfuscation, and layer widening, dummy addition, kernel widening and schedule modification in the back end are used for dimension obfuscation.

The framework 100 uses a genetic algorithm to search for the best combination of sequence and dimension obfuscations that achieve strong obfuscation for a given user-defined time budget. The obfuscation strength of the framework 100 can be measured by Layer Error Rate (LER) which represents normalized editing distance of extracted layer sequence given the ground-truth layer sequence in sequence obfuscation, and Dimension Error Rate (DER) which represents the normalized error of extracted dimension parameters in a layer in dimension obfuscation. The contributions of the framework 100 can be summarized as follows:

This is the first work on mitigating NN architecture stealing attack with pure-software obfuscation. This disclosure describes a total of 8 obfuscating knobs that can be applied by the framework 100 across an entire DNN execution stack to achieve sequence and dimension obfuscations, and demonstrate the performance on state-of-the-art GPUs.

The framework 100 is an obfuscation tool backed by genetic algorithm to search for the best combination of obfuscations to obfuscate any neural network architecture with user-defined inference latency budget.

For sequence obfuscation, the framework 100 can obfuscate a ResNet-18 architecture to have a 2.44 LER (which translates to a 44-layer editing distance) against state-of-art LSTM-based sequence predictors with only 2% increase in overall latency.

For dimension obfuscation, the present disclosure shows how a convolution layer with 64 input and 128 output channels can be obfuscated so that it is extracted as a layer with 207 input and 93 output channels with only 2% increase in layer-level latency.

II. Background

A. Neural Network Notation

Table I summarizes neural network notation that is used throughout this disclosure. In particular, the present disclosure focuses on the Conv2D operator, represented in 4D by (k1, k2, c, j).

TABLE I

NEURAL NETWORK NOTATION

| Notation | Definition |
|---|---|
| $X^{(i)}$ | Input tensor of ith layer |
| $W^{(i)}$, $U^{(i)}$, $V^{(i)}$ | Weight tensors of ith layer |
| $\varphi(.,.)$ | Activation function |
| k1, k2, c, j | Conv2D kernel sizes, input/output channel sizes |
| $h_i$, $w_i$, $h_o$, $w_o$ | Height/Width of inputs/outputs |

B. NN Execution Flow

Figure 2:
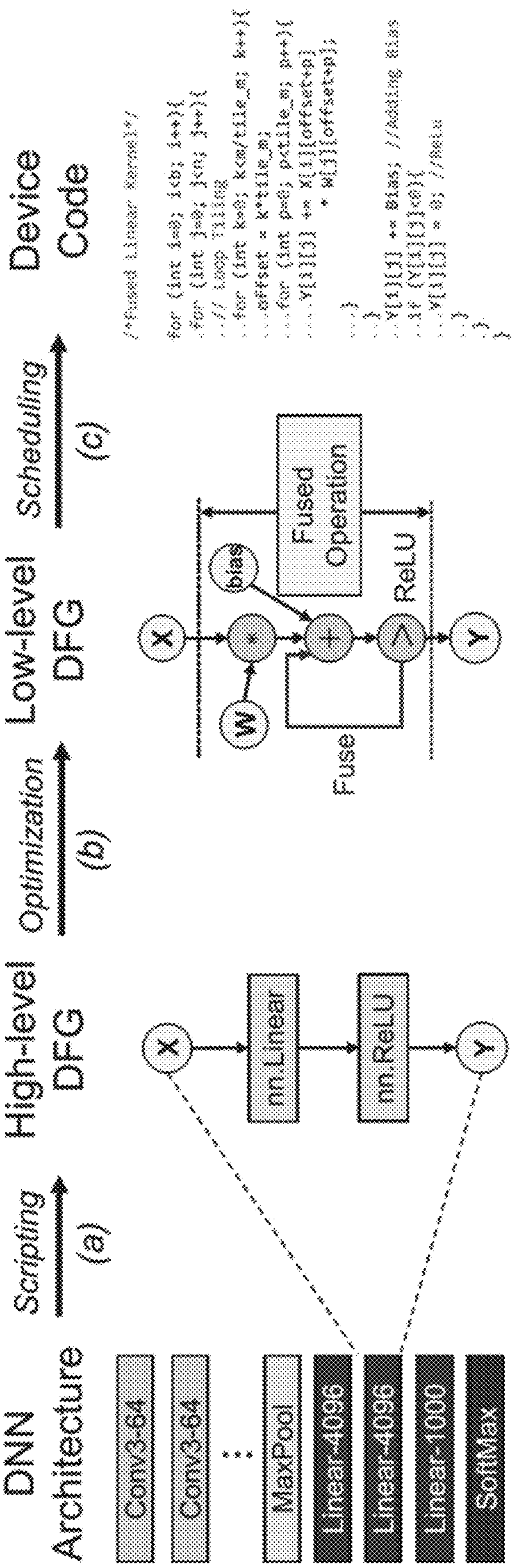
FIG. 2 is a simplified diagram showing an execution flow of a typical deep neural network including scripting, compiling and scheduling.

Generally, an NN architecture is a topology of neural network layers with non-linear functions. FIG. 2 demonstrates a typical multi-step NN execution process 10 (hereinafter, "typical process 10").

The first step of the typical process 10 is scripting (coding) of a DNN architecture using Python with popular frameworks such as Pytorch or Tensorflow. The scripting step transforms the raw design into a high-level dataflow graph (aka. computational graph). Next, the high-level graph is ported to TVM for further optimization. One can also directly use TorchScript or Tensorflow XLA for graph optimization. For instance, in TVM, the graph optimization process is handled by Relay module, which provides handy options such as: 1) "FoldConstant ( )", which evaluates expression involves only constants; 2) "EliminateCommonSubexpr ( )" which creates a shared variable for multiple expressions with same output to avoid the same expression being evaluated multiple times; and 3) "FuseOps ( )", which fuses multiple expressions together. User can specify which optimizations to enable.

The last step in the typical process 10 is scheduling which optimizes the execution of operators on a given device. In a TVM compiler framework, a machine-learning based scheduling called "AutoTVM" is used to generate optimized codes. For each operator in the optimized low-level graph, AutoTVM module uses Xgboost to search for the best schedule within a predefined search space. Point (c) in FIG. 2 shows a generic multi-level loop nest implementation of the linear operator. The search space for this linear operator is defined by a single knob, tile_m: [1,m], which determines the tiling parameter m for input X.

C. Architecture Stealing Attack Flow

Figure 3:
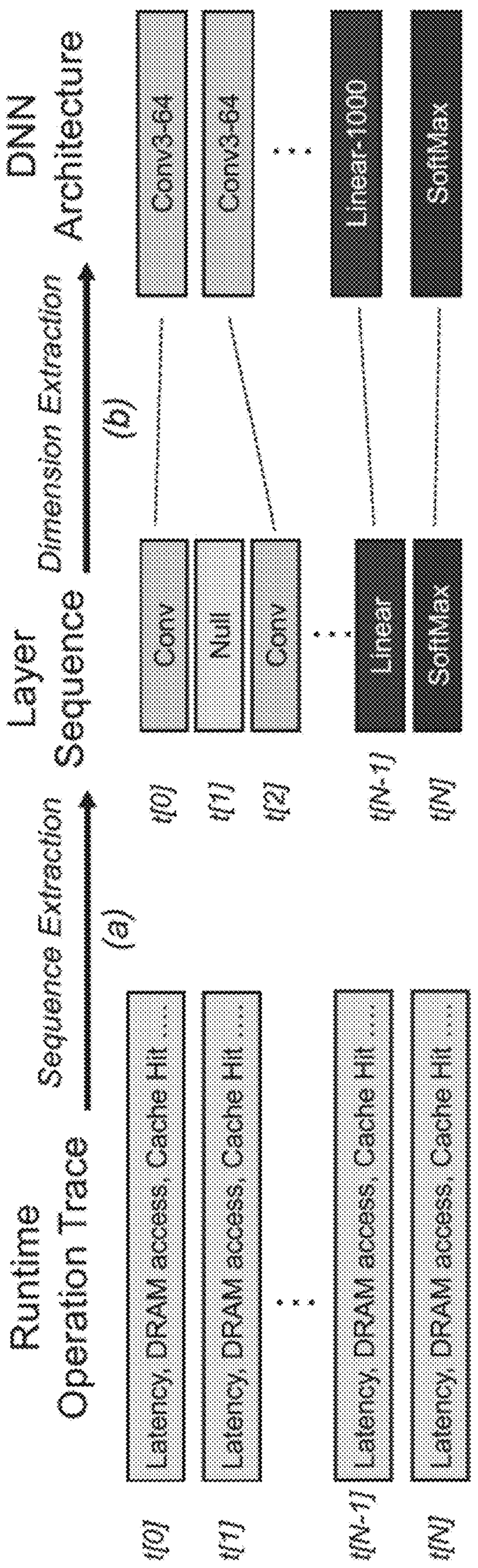
FIG. 3 is a simplified diagram showing a deep neural network architecture theft flow.

Extracting the architecture sequence is not trivial. Since neural network execution goes through several steps of optimization as shown in FIG. 2, the intermediate steps bring in lots of variations in the final device code which directly affects the hardware trace. Prior works have adopted machine learning to extract the architecture from side-channel information, and can successfully extract common architectures with very high accuracy. They share similar stealing attack methodologies as illustrated in FIG. 3 but differ in their prediction models.

Figure 9:
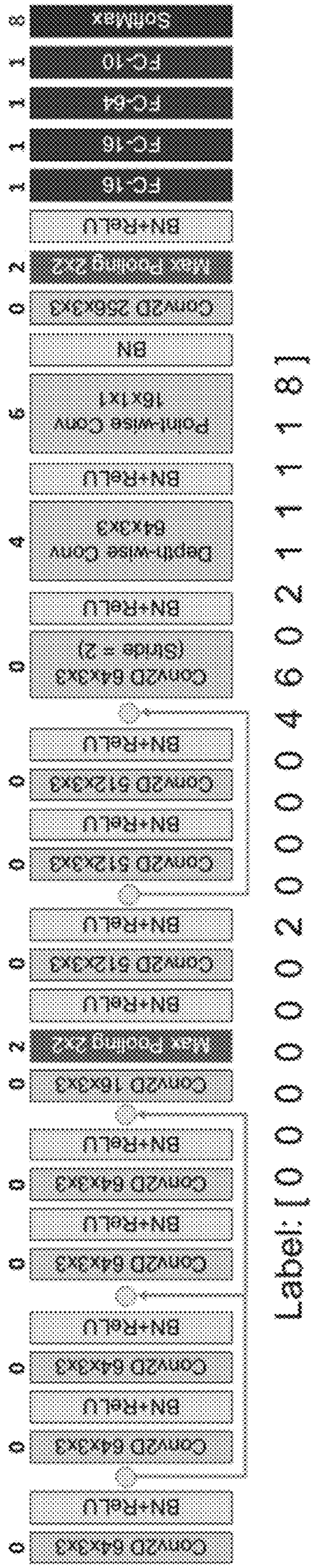
FIG. 9 is a simplified diagram showing a randomly generated architecture with labeling as generated by the framework of FIG. 8, where labeling is only done on Conv2D, Linear, MaxPool and SoftMax layers which are considered to be complex layer operators and are not fused.

Some prior works use Long-Short-Term-Memory (LSTM) models to predict the layer sequence. First, massive profiling of randomly generated DNNs on the target devices is done offline. After proper labeling (an example is shown in FIG. 9), the attacker acquires a trace-sequence dataset and uses it to train the LSTM model. At run time, the attacker uses the LSTM predictor to perform layer sequence extraction on the target DNN trace. The run time trace is time-series data consisting of multiple features as shown in FIG. 3. The sequence prediction locates the layer operator in the run-time trace and classifies it by layer type.

Dimension extraction is done for each identified layer operator once its time-step (position) and class (layer type) are known. This is considered to be simpler than sequence extraction. Note that, dimension extraction can be done either manually or automatically.

In summary, existing architecture stealing attacks heavily rely on the run-time trace, and so to mitigate such stealing attacks, our obfuscating tool changes the run-time trace as much as possible.

III. Threat Model

The present disclosure considers architecture stealing on applications running on common GPU devices. For other devices such as FPGAs, CPUs and ASICs, the obfuscation methods used by the framework 100 disclosed herein can also be used. The present disclosure considers NN applications running in both remote and local settings.

In remote setting, assume that the owner runs the NN application on a third-party cloud computing platform and the attacker acts as a normal user (without system privilege) on the same machine. Specifically, the attacker can perform "driver downgrading attack" to access the profiling API and thus conduct GPU profiling on target neural network applications at run-time.

In local setting, the present disclosure assumes that the device is off-the-shelf and the attacker can do profiling on an identical device to train a predictor model. While the target application is running, the attacker can get access to the run-time hardware traces of the target neural network applications through side-channel attacks.

Depending on the attack scenario and capability, the attacker can be categorized with respect to an extent of information leakage. Table II describes three cases (from weakest to strongest):

Case-A: Timing side-channel. The attacker can get accurate operator latency information for each time step. This case naturally includes Electromagnetic (EM) side-channel, as EM reflects the cycle information of each operator.

Case-B: DRAM side-channel. The attacker has access to the DRAM read/write information of each operator, as well as the latency through PCIE side-channel.

Case-C: Cache side-channel. The attacker enables context-switching side-channel or exploits the collocation side-channel. By profiling spy applications, the attacker samples the cache performance counters of the target applications and uses it to extract cache performance, DRAM transactions, latency of the target kernels, etc. The additional cache performance counters in Case-C include L1 cache and L2 cache utilization, hit rate and read and write data volumes.

In all cases, the attacker does massive profiling of the DNN model's run-time trace to steal the architecture.

TABLE II

DIFFERENT CASES OF INFORMATION LEAKAGE

| | Latency | DRAM-Access | Cache-Counters |
|---|---|---|---|
| Case-A | ✓ | x | x |
| Case-B | ✓ | ✓ | x |
| Case-C | ✓ | ✓ | ✓ |

IV. Trace Obfuscation

Neural network architecture stealing is possible because typical neural network execution processes are deterministic, as shown in FIG. 2. To provide a countermeasure against architecture stealing, the present disclosure provides a framework 100 (FIG. 8) for neural network obfuscation including six obfuscating "knobs" that can be applied during scripting of a neural network, including: layer widening, layer branching, dummy addition, layer deepening, layer skipping and kernel widening. Further, the present disclosure provides methods for selective fusion in graph optimization and schedule modification in the backend.

A. Obfuscation in Scripting

Many of the function-preserving transformations that have been successfully used in evolution NAS can be used in obfuscation. More specifically, the framework 100 uses layer widening, layer branching, layer deepening, layer skipping and kernel widening and dummy addition obfuscating knobs in this phase. Note that while many of these operators have been introduced before in the context of architecture evolution, the framework 100 is the first to use them as countermeasures for side-channel attacks. Layer branching is redesigned, and dummy addition is added for dimension obfuscation.

1) Layer Widening: Layer widening increases output channel j of a Conv2D layer or a linear layer. Basically, the weights of the added output channels are duplicates of the weights of existing output channels. The framework 100 allows the widening operator to take fractional numbers. For example, if the weight $$W^{(i)}_{k_1,k_2,c,j}$$

takes a widening factor of 0.25× and results in $$U^{(i)}_{k_1,k_2,c,1.25j},$$

then the first 0.5 j of the output channels come from duplication of the first 0.25 j output channels of original $$W^{(i)}_{k_1,k_2,c,j}.$$

To preserve the functionality, next layer's weights need to be adjusted accordingly. In this example, the next layer $$W^{(i+1)}_{k_1,k_2,j,m}$$

must increase its input channel size accordingly, resulting in $$U^{(i+1)}_{k_1,k_2,1.25j,m}$$

to match the increased number of output channels. The dimension parameters of $U^{(i+1)}$ for the first 0.5 j input channels have to be adjusted for the duplicated input channels.

Purpose: Layer widening increases memory accesses for the current and the next layer by around (N-1) times for widening factor N. This results in increased number of input/output channels and affects dimension extraction.

2) Layer Branching: Layer branching breaks a single NN layer operator into smaller ones. For example, a Conv2D operator $$W^{(i)}_{k_1,k_2,c,j}$$

is branched into two parts:

$$U^{(i+1)}_{k_1,k_2,c,j/2} \text{ and } V^{(i)}_{k_1,k_2,c,j/2}$$

and the final output is the concatenation of the two partial convolutions. This is referred to as output-wise branching.

$$\text{Concate}\left(U^{(i)}_{k_1,k_2,c,j/2} * X^{(i)},\ V^{(i)}_{k_1,k_2,c,j/2} * X^{(i)}\right) \tag{1}$$

While some previous works only consider output-wise branching of Conv2D/linear layers, the framework 100 also considers layer branching in the input channel dimension, referred to as input-wise branching. Here a Conv2D layer of weight $$W^{(i)}_{k_1,k_2,c,j}$$

is branched into two:

$$U^{(i)}_{k_1,k_2,c/2,j} \text{ and } V^{(i)}_{k_1,k_2,c/2,j},$$

and the final result is the addition of the two.

$$\text{Add}\left(U^{(i)}_{k_1,k_2,c/2,j} * X^{(i)},\ V^{(i)}_{k_1,k_2,c/2,j} * X^{(i)}\right) \tag{2}$$

Note that the activation input needs to be sliced into two to match the halved input channel dimension of two smaller convolutions. Various branching methods are feasible, for example, one can also separate it into more than two parts or even do unbalanced branching. Here the present disclosure considers balanced branching into two or four parts, for both input-wise and output-wise branching.

Purpose: Layer branching increases the number of layer operators and changes the data volume that needs to be accessed for each operator. For input-wise branching, the input activation and weight volume are halved for each small kernel, and for output-wise branching, input activation is the same but weight and output activation volumes are halved. This knob can be used for both sequence and dimension obfuscation.

3) Dummy Addition: Dummy addition is simply adding zero to the activation results. The framework 100 creates a zero matrix of the same shape as the activation output X of current layer.

$$D^{(i)}_{b,j,h_o,w_o} = O_{b,j,h_o,w_o} \tag{3}$$

A dummy addition factor of N means that we create and add the dummy matrix to the output repeatedly N×.

Purpose: Addition operators are "fused" into previous layer operators in the fusion step in graph optimization (refer to FIG. 2) and so the extra cache accesses from the addition operator get added to the layer computation and affect extraction of dimension parameters of that layer.

4) Layer Deepening: Layer deepening inserts an extra computational layer at the end of current layer's activation function. The insertion of a deepening layer $U^{(i)}$ does not change the original result.

$$\varphi(U^{(i)} * \varphi(W^{(i)} * X^{(i)})) = \varphi(W^{(i)} * X^{(i)}) \tag{4}$$

For linear layers, the deepening layer $U^{(i)}$ is simply an identity matrix of the same size as its input. For Conv2D layer, layer $U^{(i)}$ of size ($k_1$, $k_2$,j,j) need to be initialized as:

$$U^{(i)}_{a,b,d,m} = \begin{cases} 0 & a = \frac{k_1 - 1}{2} \wedge b = \frac{k_2 - 1}{2} \wedge d = m \\ 1 & \text{otherwise} \end{cases} \tag{5}$$

Figure 4A:
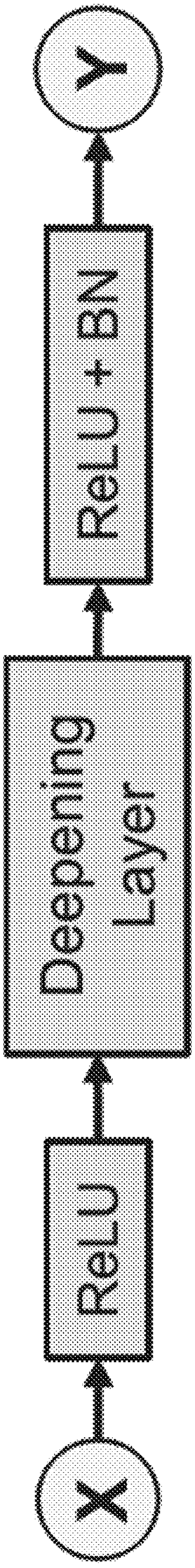
FIG. 4A is a simplified diagram showing an example of a layer deepening step of a neural network obfuscation framework described herein that adds an extra computational layer for sequence obfuscation.

The framework 100 favors a kernel size of $k_1$=$k_2$=1 which avoids too much extra computation. Notice that the correctness of Eq. (4) also depends on whether the activation function φ(•) results stay the same when it gets stacked φ(•)=φ(φ(•)). Fortunately, the most popular ReLU activation subscribes to this property. The same property does not hold for batch normalization, so the deepening layer must be added before batch normalization, as shown in FIG. 4A.

Purpose: Add an extra computational layer to the layer extraction result. This can be used for sequence obfuscation.

Figure 4B:
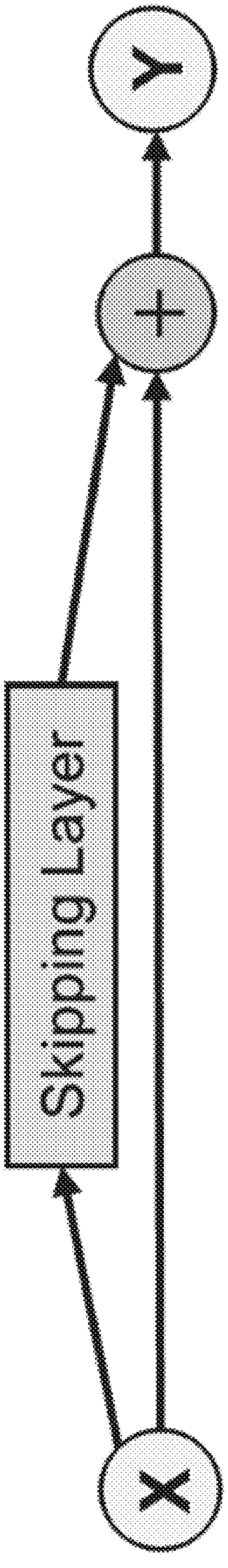
FIG. 4B is a simplified diagram showing an example of a layer skipping step of the neural network obfuscation framework described herein that adds an extra computational layer for sequence obfuscation.

5) Layer Skipping: Layer skipping inserts an extra computational layer as illustrated in FIG. 4B. The additional layer, referred to as skipping layer, operates on the activation output of an existing layer and adds it to the original activation output. The skipping layer is initialized to zero and thus always has a zero output matrix.

For an activation of size (b, j, $h_o$, $w_o$), the skipping layer can be a Conv2D layer $U^{(i)}$ that has a shape of ($k_1$, $k_2$, j, j) and all entries are zero. The output of the skipping layer is:

$$U^{(i)} * X_{b,j,h_o,w_o} + X_{b,j,h_o,w_O} = X_{b,j,h_o,w_O} \tag{6}$$

Purpose: Add an extra computational layer to the layer extraction result. This can be used for sequence obfuscation.

6) Kernel Widening: Kernel widening increases the kernel size of a Conv2D layer. It is done by padding zeros to both the input and convolution kernels. A kernel widening of "+1" to a Conv2D layer of shape ($k_1$, $k_2$, c, j) results in a new weight of shape ($k_1$+2, $k_1$+2, c, j) and input of shape (b, c, $h_i$+2, $w_i$+2). This is useful in particular for Conv2D layers that have kernel size of 1×1. These small 1×1 kernels would then transform to 3×3 kernels after widening.

Purpose: Change kernel size of the Conv2D operator, resulting in a completely different trace. This affects dimension extraction.

B. Obfuscation in TVM-based Graph Optimization

Figure 5A:
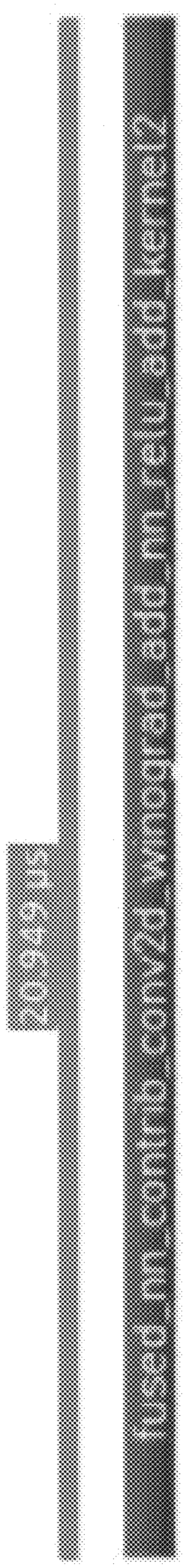
FIG. 5A is a screenshot showing an example Conv2D operator being fused with "add" and ReLU kernels.

Fusion is an important graph optimization technique in the TVM Relay module. It fuses subsequent injective operators (scaling or addition) in complex layer operators, such as Conv2D, linear and max-pooling, and transforms the shape of the inputs completely. Fusion ensures execution efficiency as it improves the data reuse and avoids context switching overhead. As shown in FIG. 5A, the fused operator is significantly faster than sum of the separate operators.

Figure 5B:
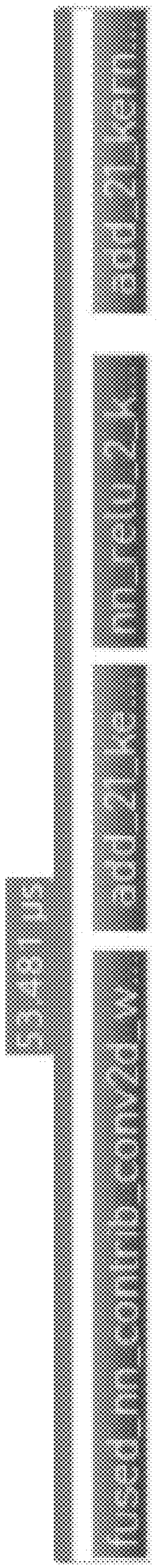
FIG. 5B is a screenshot showing an example Conv2D operator being issued separately from "add" and ReLU kernel, which results in a significant increase in execution time.

7) Selective Fusion: Selective fusion is a controllable version of the generic fusion. While the generic fusion fuses successive injective operators greedily, the selective fusion allows N successive operators to fuse and forbids more operators to fuse. For example, by setting N to zero for a Conv2D operator shown in FIG. 5B, the Conv2D operator will be issued separately.

Purpose: Increase the number of operators. Setting N to a small value decreases the memory access and latency of a layer operator, and affects both sequence and dimension extraction.

C. Obfuscation in Scheduling

In the backend, AutoTVM handles the compilation and generates optimized code for a given device. It provides options such as the number of trials for tuning, etc.; as such, AutoTVM was investigated to determine whether these options can be used to generate randomness in the final result and thereby help in obfuscation. In particular, 3 rounds were tried with different number of trials using the default Xgboost (XGB) tuner in AutoTVM for a Conv2D operator. All these trials generated the same schedule, which is understandable because tuning is designed to optimize latency. The profiling results in FIG. 6 also show that the cycle, DRAM read and L1 cache utilization are very similar for different number of tuning options (XGB-200, 400 and 800 denoted by bars 1-3), meaning AutoTVM derived schedule is deterministic and cannot be directly used for obfuscation.

Figure 6:
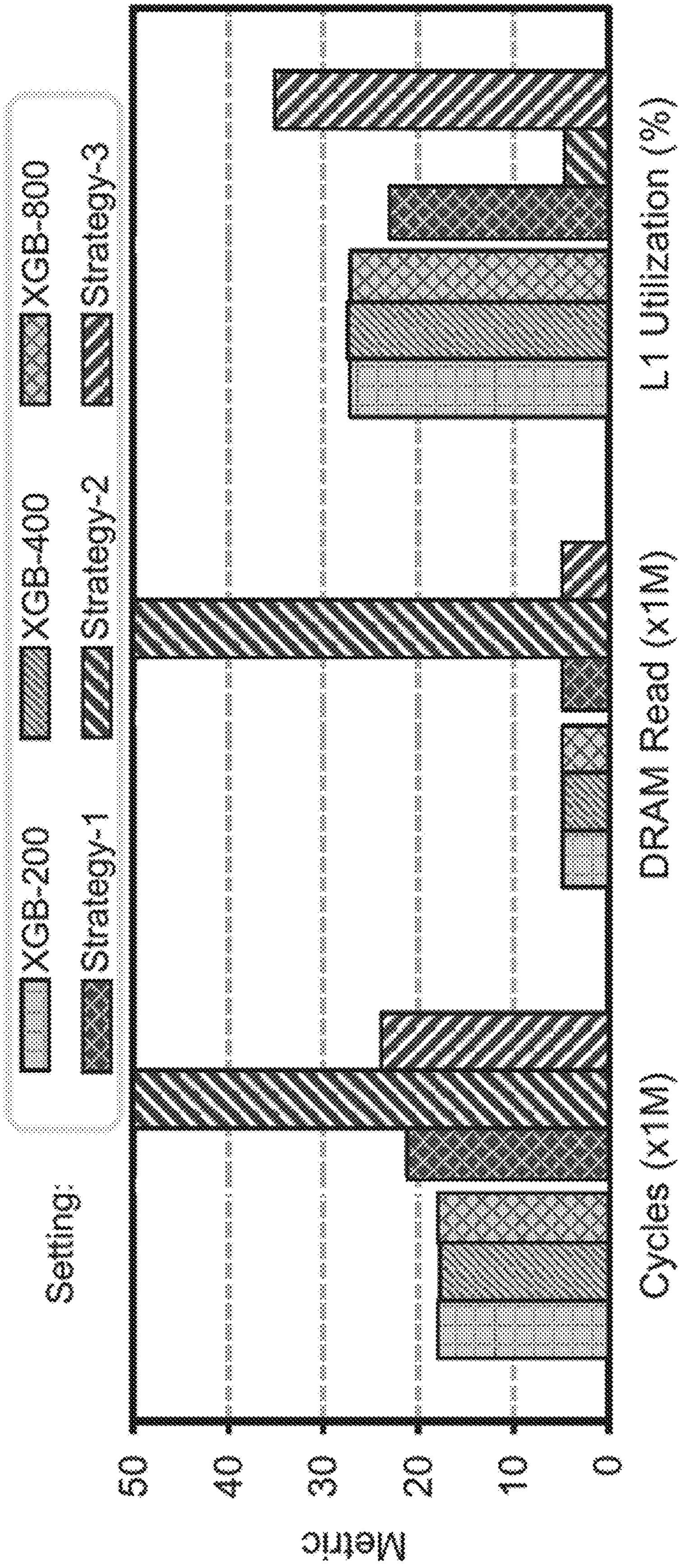
FIG. 6 is a graphical representation showing profiling results of AutoTVM derived schedules using Xgboost tuner with varying numbers of trials (bars 1-3) and results using strategies employed by the neural network obfuscation framework described herein (bars 4-6)

8) Schedule Modification: To generate schedules via AutoTVM with different outcomes, the search space has to be modified. Actually changing the search space requires a time-consuming tuning (searching) process each time, and so the framework 100 employs a simple approach that directly modifies the derived schedules with a small sacrifice on operator's performance. For example, the schedule derived by Xgboost in FIG. 6 is [−1, 4, 8, 4] for "Tile-Y" and [−1, 2, 4, 2] for "Tile-X". The first dimension of the tiling is for mini-batch so it is fixed as −1. The framework 100 employs a modification strategy that forces each of the other dimensions to be 1. For example, the schedule for "Strategy-1" forces the second dimension to be 1, which produces [−1, 1, 8, 16] for "Tile-Y" and [−1, 1, 4, 4] for "Tile-X". The values of other two dimensions were set by keeping the product be the same as original (8×16=4×8×4) and let them be as close as possible. Three modified schedules were derived using this method. Their profiling result is shown in bars 4-6 of FIG. 6. For latency and L1 cache utilization, all three schedules show noticeable difference. Strategy-2 is an example of bad modification, where the DRAM read and number of cycles explodes and L1 cache utilization is very poor. Strategy-1, on the other hand, helps achieve obfuscation without hurting the performance too much.

Purpose: Derive different schedules for the same operator that present differences in latency, DRAM access and cache performance. This affects dimension extraction.

V. NeurObfuscator Tool Flow

A tool flow of the framework 100 includes two key steps: 1) sequence obfuscation which obfuscates the layer sequence including layer type and topology, and 2) dimension obfuscation which obfuscates the dimensions of individual layer operators. The roles of each obfuscating knob of the framework 100 are summarized in FIG. 7. Knobs with star superscripts affect both sequence and dimension extraction.

This disclosure investigates sequence and dimension obfuscation separately since their purpose is orthogonal. This also helps comparison with prior work that focuses only on sequence obfuscation. In addition, to reduce search time, the framework 100 reduces the search space as follows.

Figure 7:
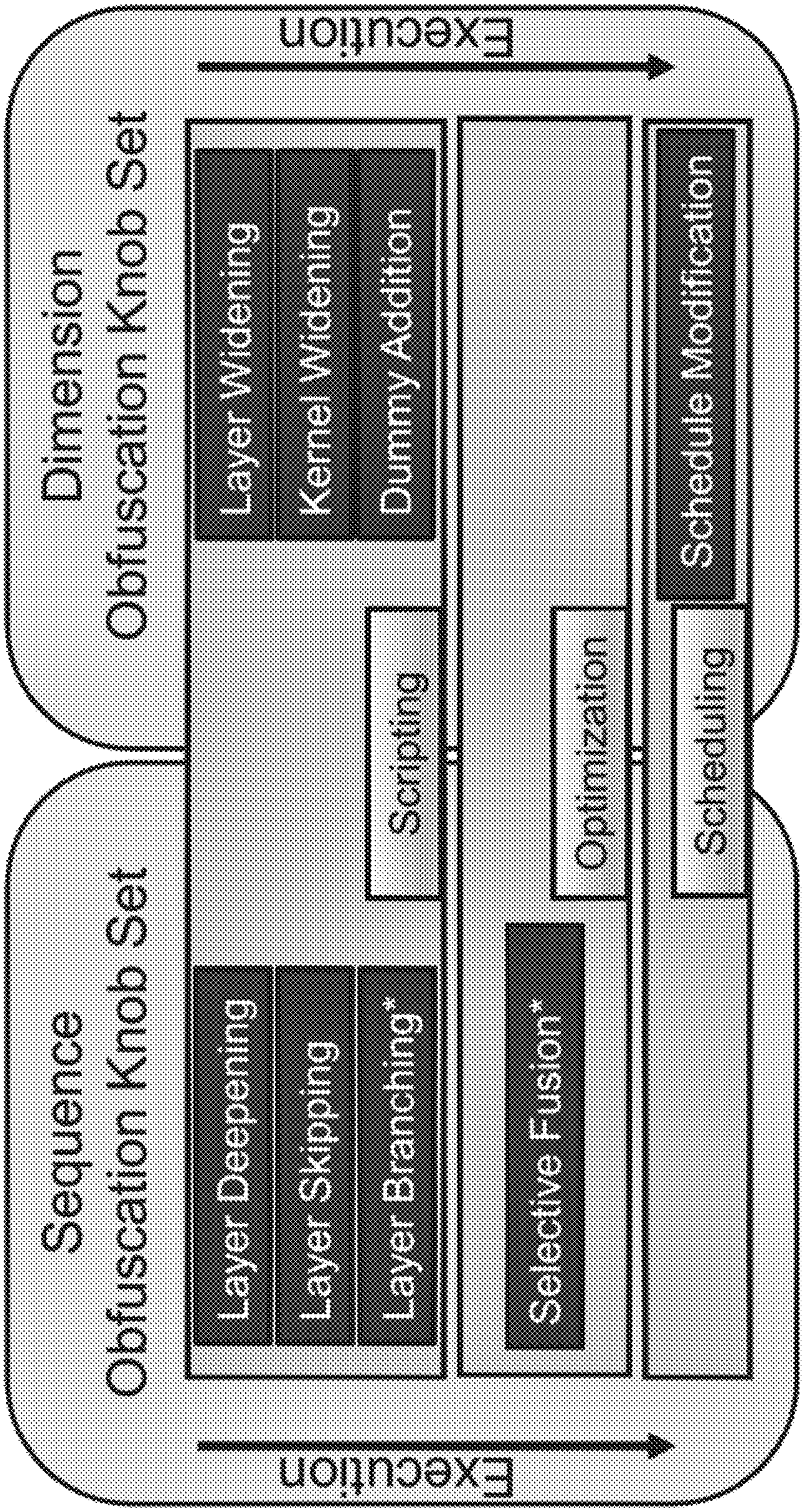
FIG. 7 is a simplified diagram showing obfuscating knobs of the neural network obfuscation framework described herein being divided into two sets.
Figure 12:
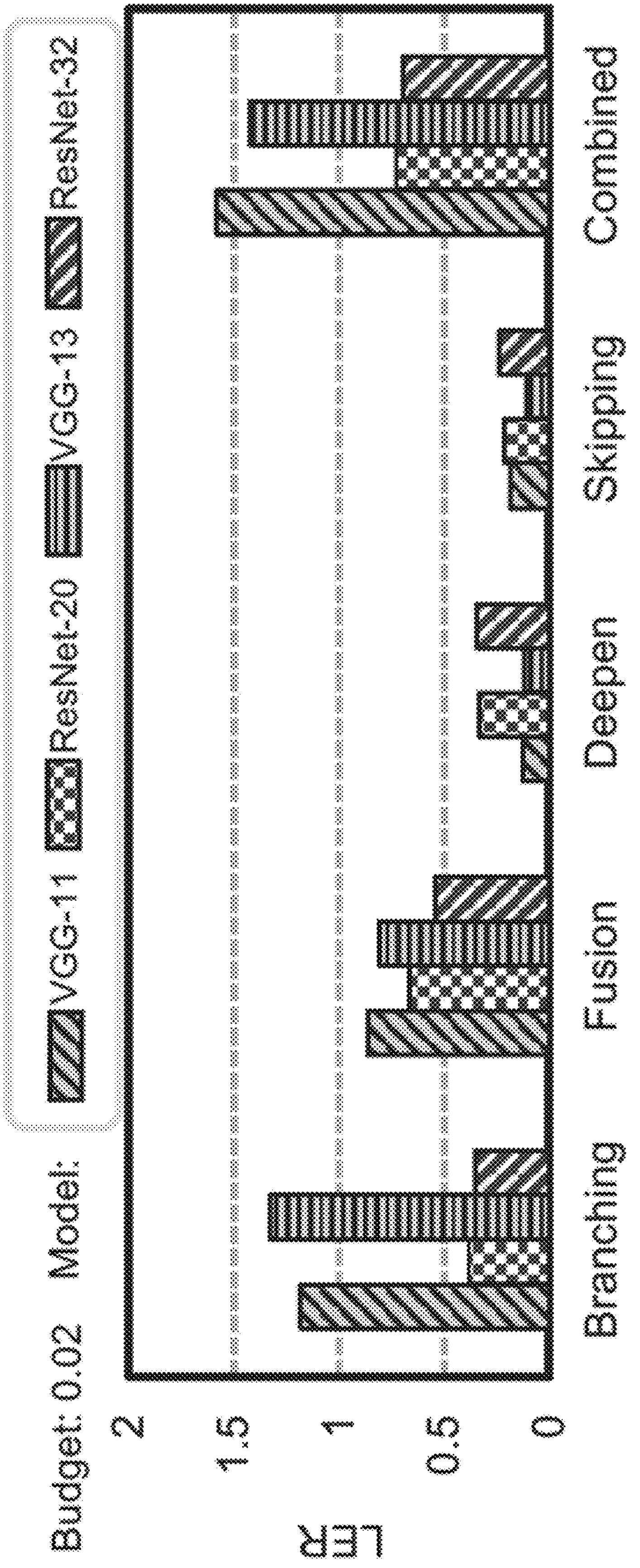
FIG. 12 is a graphical representation showing individual contribution of each sequence obfuscating knob in the Genetic Algorithm-based Obfuscator of FIG. 11 followed by a combination effect, where time budget is selected at 0.02 and where VGG-11, VGG-13, ResNet-20 and ResNet-32 are on CIFAR-10 dataset.

Knob Partition. First, the framework 100 partitions the set of knobs, as shown in FIG. 7. Selective fusion and layer branching are placed together with layer deepening and layer skipping in the sequence obfuscation knob set. The remaining 4 knobs, namely, layer widening, kernel widening, dummy addition and schedule pruning are considered for dimension obfuscation. Among them, selective fusion and layer branching knobs clearly affect both sequence & dimension obfuscation. The framework 100 exclusively uses them in sequence obfuscation where they play a dominant role (FIG. 12). The four knobs for dimension obfuscation affect dimension parameters significantly while affecting the sequence obfuscation very mildly. In the extreme case, a large change in layer dimension can possibly flip the layer type in sequence obfuscation.

Limited Obfuscation Knob Option. Each obfuscation knob of the framework 100 comes with a list of options where the i-th entry of the list denotes a specific obfuscation choice for the i-th layer operator. The available options for each entry are limited to reduce the search time. For example, the framework 100 limits the layer deepening and layer skipping to at most 1, which means at most one deepening layer and one skipping layer can be applied to each layer.

Restricted Search Space. The framework 100 restricts the search space by keeping the number of entries (length of the list) for each knob fixed based on the vanilla architecture. Otherwise, knobs such as branching, deepening and skipping add extra computational layers and can result in the search space exploding if they are applied recursively.

A. Sequence Obfuscation

A combinatorial optimization problem is modeled to derive the best set of obfuscating knobs for sequence obfuscation, which can be solved using a genetic algorithm. The framework 100 finds the set of sequence obfuscating knobs such that the obfuscated NN achieves strong obfuscation and can be executed within a given time budget. The obfuscation metric is given by layer prediction error rate or LER and the time budget is a small fraction of the inference latency. The overview of the obfuscation framework is given in FIG. 8.

The inputs to the framework 100 are a vanilla neural network model (e.g., an unmodified neural network architecture to be obfuscated by the framework 100) and time budget (steps 1-3). A computing device 200 (FIG. 16) where the framework 100 is running on can also be considered an underlying input since it determines the trace. The search space is based on the vanilla model. The framework 100 performs initial profiling to derive clean latency T* and clean trace. An Obfuscator 102 of the framework 100 applies a selected set of obfuscation knobs in step 4 and runs inference. The profiling is performed on the obfuscated model in step 5 and an Evaluator 104 of the framework 100 calculates a fitness score given the latency and layer prediction error rate (LER) in step 6. This process can be iteratively repeated until the neural network model is sufficiently obfuscated. When fitness score converges (circling through steps 4, 5 and 6), the framework 100 outputs the compiled binaries of the obfuscated model.

1) Evaluator: LSTM Predictor Testbed: To evaluate the obfuscation effect, a testbed is provided that performs stealing attack on the obfuscated architecture based on existing stealing methods.

Dataset Generation. To mimic the attacker, first, massive profiling has to be done on the user's device. A random neural network architecture generator was built for this purpose, which is used as input to the profiling toolset. It first fixes the depth of the network (number of computational layers), and at each step, randomly inserts neural network convolution layer with random dimension parameters (input channel size and output channel size), ResNet and MobileNet computing blocks and pooling/batch normalization (BN) layers. Linear layers with random number of neurons are added only after all the Conv2D layers. The classification layer (linear layer with neuron equals to the number of class) and the softmax layer are added at the end. 6,000 different neural network architectures are generated for input size of [3, 32, 32] and number of classes equals to 10, to match the CIFAR-10 dataset setting. Another 6,000 architectures are generated for input size of [3, 224, 224], and number of classes equal to 1,000 to match the ImageNet dataset setting. Because normally the BN/ReLU are fused with complex layer operators (Conv2D, Linear, etc.), only the complex operators are labeled. An example of a randomly generated architecture is shown in FIG. 9.

Run-Time Profiling. Both the offline and run-time profiling is done using Nsight Compute (a tool for CUDA kernel profiling, similar to NVPROF), which uses "kernel replay" for accurate trace generation. This tool is used to simulate the three cases (cases A, B and C) of attack described in Section III. Two contemporary NVIDIA GPUs are used for profiling, i.e., a Turing GPU (GTX-1660) to profile models on CIFAR-10 dataset and an Ampere GPU (RTX-3090) to profile models on ImageNet dataset. A number of cycles, DRAM and cache performance metrics are collected for each issued operator of the model running in inference mode. The metric guide from NSight Compute is followed to select proper features for three cases. In practice, the attacker gets noisy trace information through side-channels. To study the worst-case (i.e., strongest attack), it is assumed that the attacker can obtain an accurate trace.

LER metric. The LSTM-based predictor for the testbed is a single-layer LSTM-RNN model with a Connectionist Temporal Classification (CTC) decoder as adopted in Deepsniffer. The Layer prediction Error Rate (LER) is used to quantitatively measure the performance of a trained predictor. The LER has the form:

$$LER = \frac{ED(L, L*)}{|L*|} \tag{7}$$

where L is the predicted sequence and L* is the ground-truth, ED denotes editing distance (Levenshtein distance [131) and |·| denotes the length.

Three sets of LSTM predictors are derived—one for each attack case. For each case, a number of hidden units of the LSTM network is set to be 64, 96, 128, 256 and 512, resulting in a total of 3×5=15 LSTM predictors. Each dataset is split into 4:1 for training and validation subsets, and trained for 150 epochs. The final validation LERs for all the LSTM predictors are shown in Table Ill. An excellent layer sequence extraction performance is observed on Case-C, where all the latency, DRAM and cache features are considered for each time-step, and a comparatively poor performance for Case-A, where only the latency feature is considered.

TABLE III

VALIDATION LER OF LSTM-BASED LAYER SEQUENCE PREDICTORS

| | CIFAR-10 | | | ImageNet | | |
|---|---|---|---|---|---|---|
| LSTM unit | Case-A | Case-B | Case-C | Case-A | Case-B | Case-C |
| 64-unit | 0.095 | 0.100 | 0.001 | 0.178 | 0.027 | 0.002 |
| 96-unit | 0.121 | 0.087 | 0.007 | 0.291 | 0.035 | 0.000 |
| 128-unit | 0.126 | 0.045 | 0.008 | 0.292 | 0.044 | 0.001 |
| 256-unit | 0.077 | 0.023 | 0.013 | 0.283 | 0.031 | 0.004 |
| 512-unit | 0.098 | 0.074 | 0.000 | 0.303 | 0.036 | 0.003 |

Figure 10:
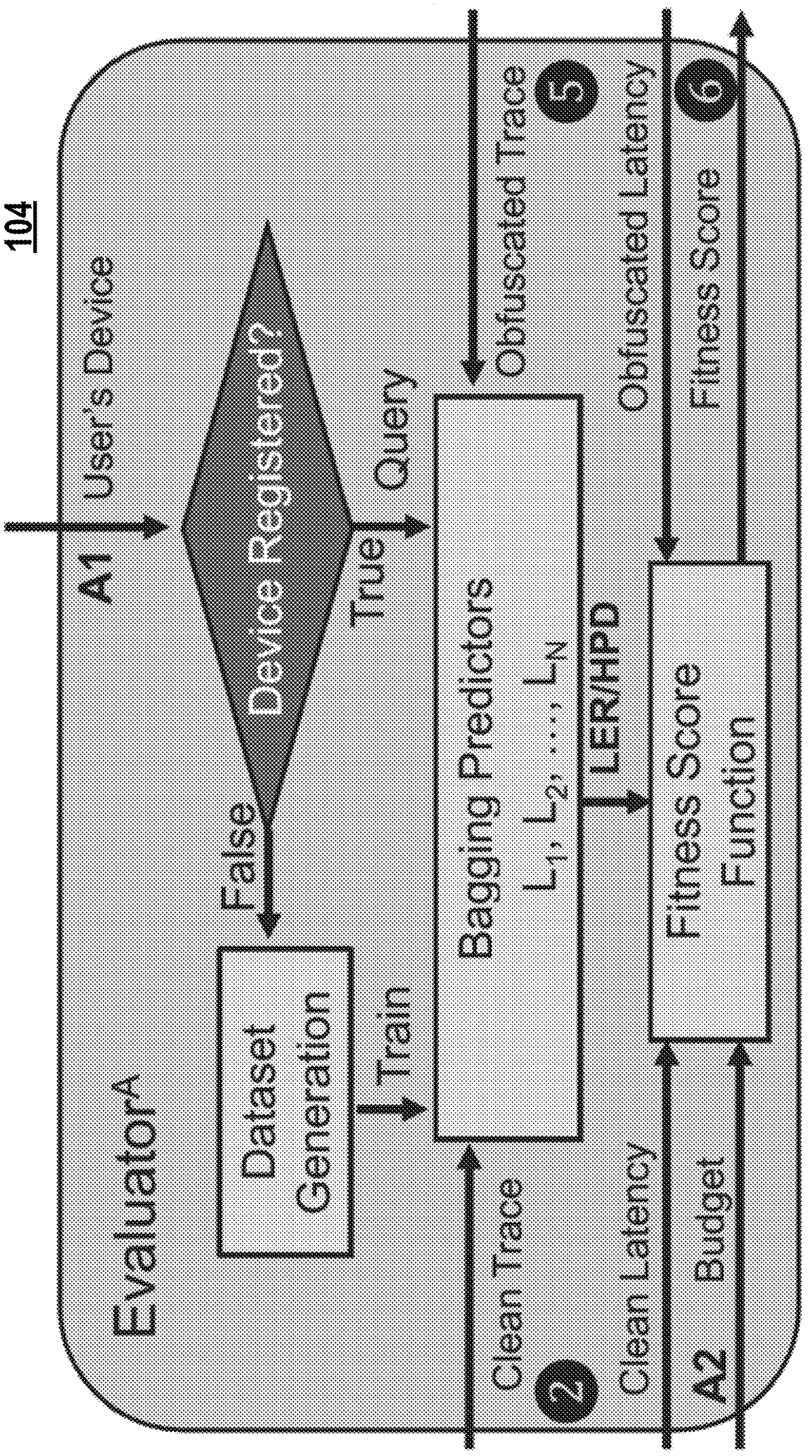
FIG. 10 is a simplified diagram showing an Evaluator of the framework of FIG. 8, where bagging predictors supply LER (in sequence obfuscation) or DER (in dimension obfuscation) to determine a fitness score function.

Predictor Training. The Evaluator 104 of the framework 100 uses the bagging approach and provides the average LER of LSTM predictors for different input sizes, where the input sizes are chosen to match that of CIFAR-10 and ImageNet datasets. The Evaluator 104 is shown in FIG. 10. The training needs to be done once for each new device.

2) GA-based Obfuscator: The next goal is to maximize the obfuscation given a user-defined latency budget, B using the Obfuscator 102. For instance, B=0.1 means that the user can afford up to 10% extra inference latency. Then the optimization problem can be set up as a constrained discrete optimization problem that maximizes the average LER given the latency budget:

$$\begin{aligned} &\min_{s} \frac{1}{N}\sum_{i=1}^{N} LER_i(S) \\ &\text{s.t. } T \le (1+B)T^* \end{aligned} \tag{8}$$

where, N is the number of predictors in bagging, S denotes the set of obfuscation options, T is the latency with obfuscation and T* is the clean latency without obfuscation.

Genetic Algorithm. The genetic algorithm (GA) is selected to solve the discrete optimization problem. Since the optimization with constraints in Eq. (8) cannot be directly used in GA the reward R (a.k.a. fitness score) for GA is designed as follows:

$$R = \frac{1}{N}\sum_{i=1}^{N} LER_i(S) / \left[\epsilon + \left(\frac{T-(1+B)T^*}{T^*}\right)^2\right] \tag{9}$$

Figure 11:
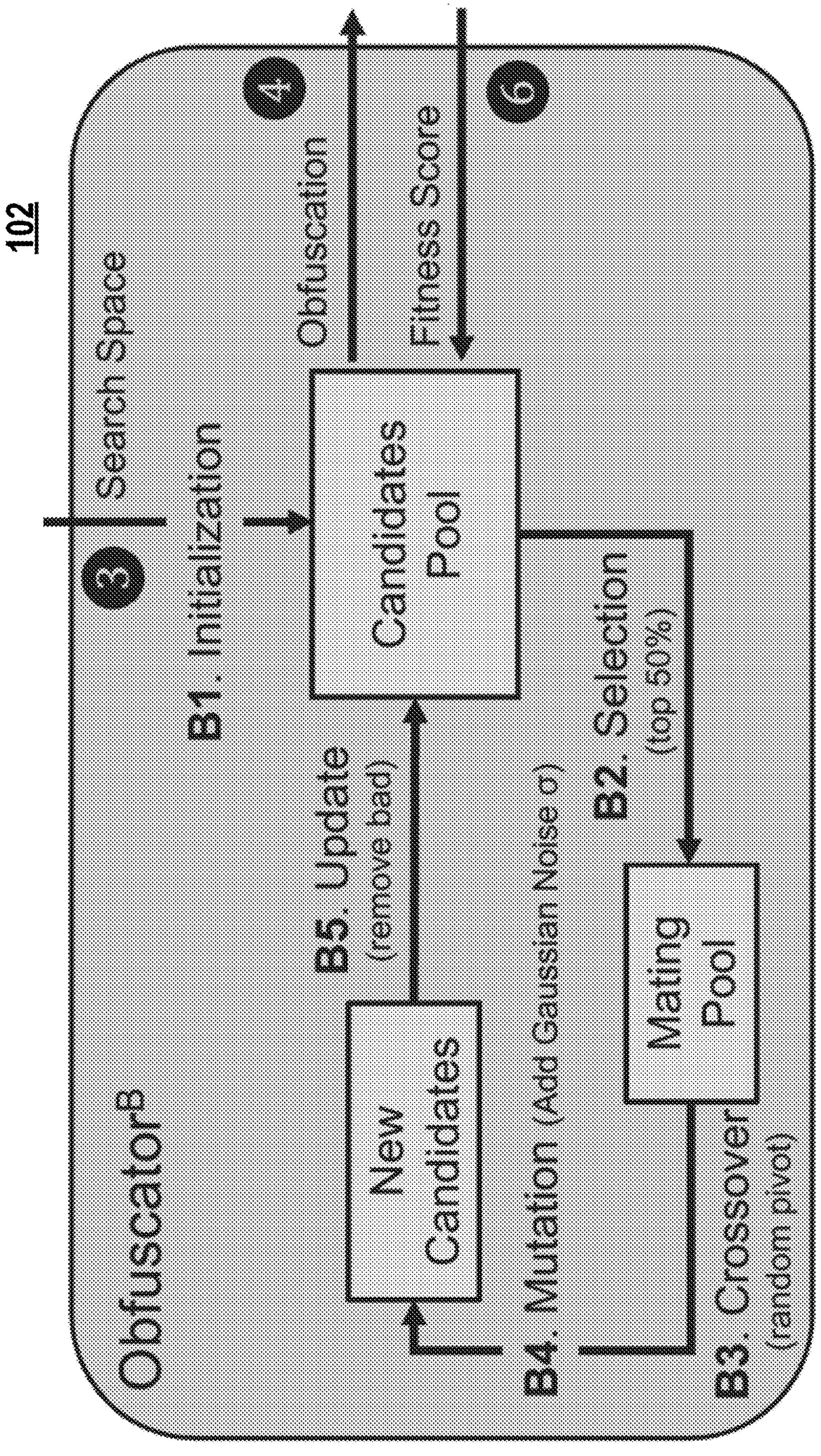
FIG. 11 is a simplified diagram showing a Genetic Algorithm-based Obfuscator of the framework of FIG. 8.

The constraints in Eq. (8) are replaced with a penalty term, which penalizes the reward when latency T deviates from the total latency (1+B)T*. This deviation is normalized and squared and a small offset term ϵ is added to avoid zero proximity. The block diagram of the Obfuscator 102 is shown in FIG. 11; note that the Obfuscator 102 is GA-based.

Figure 8:
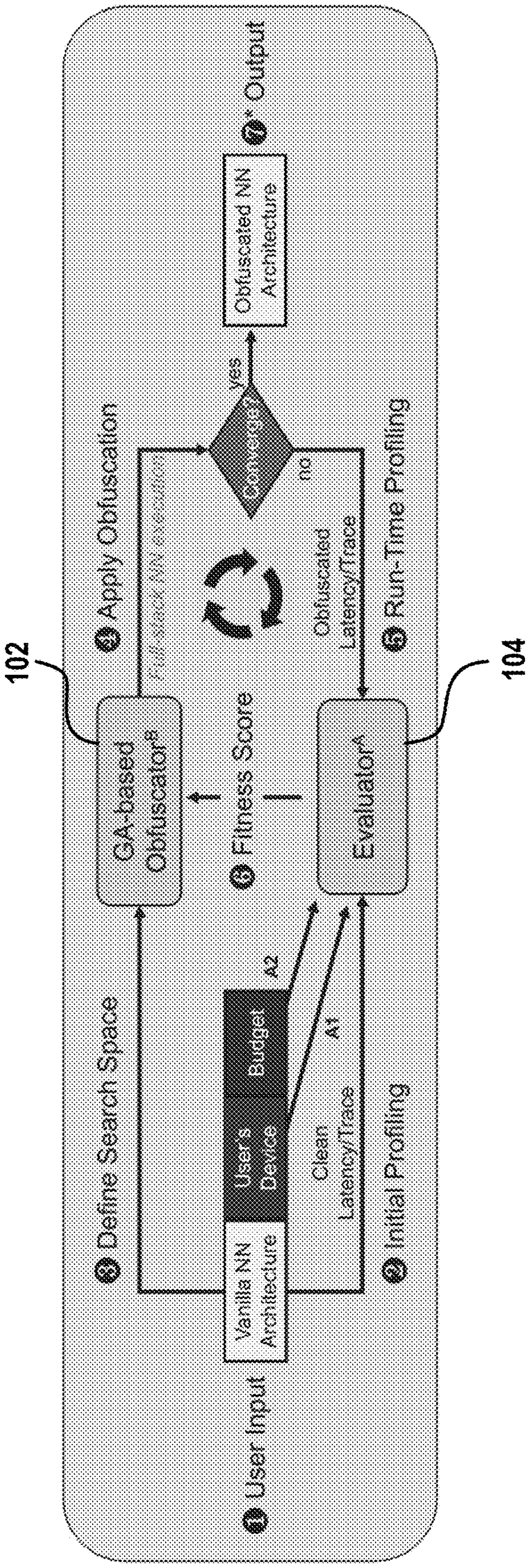
FIG. 8 is a simplified flowchart showing the neural network obfuscation framework described herein.

The initial value of each obfuscating knob is randomly generated based on the search space provided in step ❸ in FIG. 8. For the mating process, the top 50% of the population based on fitness score are added into the mating pool. The crossover process takes random pivot of two lists and produces the same number of offsprings. In the mutation process, Gaussian noise is applied with standard deviation σ on each of the offspring obfuscation sets with rounding and clipping to keep the value in legal format. Mutated offsprings are added into the candidate pool, and half of the candidates (including newly added offsprings) that have lowest fitness scores are removed from the candidate pool. The pool of candidates gradually improve over generations resulting in high fitness scores.

B. Dimension Parameter Extraction

For dimension obfuscation, the present disclosure focuses on the obfuscating knobs, such as layer widening, kernel widening, dummy addition and schedule modification, that affect the dimension parameters the most. Obfuscation is described herein on standard Conv2D operators as they appear most frequently in the DNN architectures that were tested.

DER metric. To evaluate the prediction error of a layer's dimension parameter, the Dimension parameter prediction Error Rate (DER) is used as a measure of the obfuscation effect similar to the LER metric. If the number of input/output channels of a Conv2D operator be (c, j), the DER for a given prediction (c, j) on layer i is defined as:

$$DER(i) = \frac{|C - c^*|}{c^*} + \frac{|j - j^*|}{j^*} \tag{10}$$

where, c* and j* represent the original (without obfuscation) input and output channels, respectively.

Predictor Training. The Random Forest (RF) model is adopted as a bagging version of decision trees for the dimension parameter extraction testbed. Around 50,000 traces are collected for Conv2D operators with different input channel and output channel parameters (c, j), which are the two most important dimension parameters. Note that stride, kernel size and padding features are a lesser focus of this disclosure because they rarely change. In particular, an RF regression model is trained with a different number of trees (30, 50, 100 and 200) to predict c and j separately. The training and validation ratio is set to 4:1. The average DER of the validation dataset (20% of the data) is recorded for ImageNet and CIFAR-10 for the three attack cases. The results in Table IV show that the dimension extraction has negligible error for cases B and C and comparably high error for Case-A because it has only latency feature. Furthermore, the number of trees do not affect the prediction performance much.

TABLE IV

AVERAGE DER OF RANDOM FOREST REGRESSION MODEL FOR DIMENSION EXTRACTION.

| Number | CIFAR-10 | | | ImageNet | | |
|---|---|---|---|---|---|---|
| of Trees | Case-A | Case-B | Case-C | Case-A | Case-B | Case-C |
| 30-tree | 0.467 | 0.060 | 0.014 | 0.160 | 0.041 | 0.023 |
| 50-tree | 0.465 | 0.060 | 0.014 | 0.160 | 0.041 | 0.023 |
| 100-tree | 0.462 | 0.059 | 0.014 | 0.160 | 0.040 | 0.023 |
| 200-tree | 0.464 | 0.059 | 0.014 | 0.159 | 0.040 | 0.023 |

The dimension obfuscation framework is similar to that of sequence obfuscation of the framework 100 shown in FIG. 8. The user needs to specify a budget that limits the latency increase in dimension obfuscation for each layer. The evaluator 104 (FIG. 10) uses the RF regression model as the "Bagging Predictor" and average DER of all three attack cases to compute the fitness score. Note that the Obfuscator 102 (FIG. 11) for dimension obfuscation has a different search space because a different set of obfuscating knobs is considered.

VI. Evaluation

A. Sequence Obfuscation Performance

The performance of our obfuscation tool was evaluated on a series of standard models. Specifically, VGG-11, VGG-13, ResNet-20, and ResNet-32 models were selected on CIFAR-10 dataset running on a Turing GPU (GTX-1660). VGG-19, ResNet-18 and MobileNet-V2 models were selected on ImageNet dataset running on an Ampere GPU (RTX-3090). For the GA, the population size was set to be 16 and was ran until the fitness score stabilized, which occurred around 20 generations. The standard deviation σ for the mutation step was set to a high value (i. e. σ=8.0) at the beginning and was halved after every 4 generations. To eliminate the randomness, for each data point reported here, the average of 3 runs was selected.

Effect of Individual Knobs. First, this disclosure investigates the effect of individual knobs on stand-alone Conv2D operators with different dimension parameters. Latency overhead in each case is listed in Table V. Layer branching introduces extra operators with a low latency cost. For example, output-wise layer branching by 4 adds 3 extra Conv2D operators and 1 concatenate operator with at most 49% latency increase. Selective fusion increases latency by around 15% but it only introduces one extra ReLU operator and BN operator. In contrast, deepening layer and skipping layer introduce an extra Conv2D operator at a lot higher latency cost, and is thus not effective.

Since the latency overhead due to application of an obfuscation knob on a single operator is large, the obfuscation knobs have to be applied selectively to only certain layers. Next, this disclosure demonstrates the contribution of individual knobs on a full model using the Obfuscator 102 which is GA-based. Only one obfuscating knob was allowed to be available at a time during the GA search, with a budget of B=0.02. The results are shown in FIG. 12. Layer branching and selective fusion have higher LER for the same latency budget and are clearly better choices. Branching seems to works significantly better than fusion in VGG networks while fusion works as good as branching in ResNet networks. The selective combination of 4 knobs by the framework 100 achieves stronger obfuscation than any single knob, as expected.

TABLE V

| EFFECT OF INDIVIDUAL SEQUENCE OBFUSCATING KNOBS | | |
|---|---|---|
| Knobs | Extra Operator | Latency Overhead |
| Branching (output-wise by 2) | 1 × Conv2D, 1 × Concate | 21%~27% |
| Branching (output-wise by 4) | 3 × Conv2D, 1 × Concate | 38%~49% |
| Selective Fusion (N = 0) | 1 × ReLU, 1 × BN | 14%~15% |
| Layer Deepening | 1 × Conv2D (1 × 1 kernel) | 39%~89% |
| Layer Skipping | 1 × Conv2D | 70%~130% |

NeurObfuscator—Sequence Obfuscation. This disclosure demonstrates the performance of the framework 100 on CIFAR-10 and ImageNet datasets. For VGG-11, VGG-13 and ResNet-32 running on CIFAR-10, bagging of all 15 LSTM predictors was used.

Figure 13:
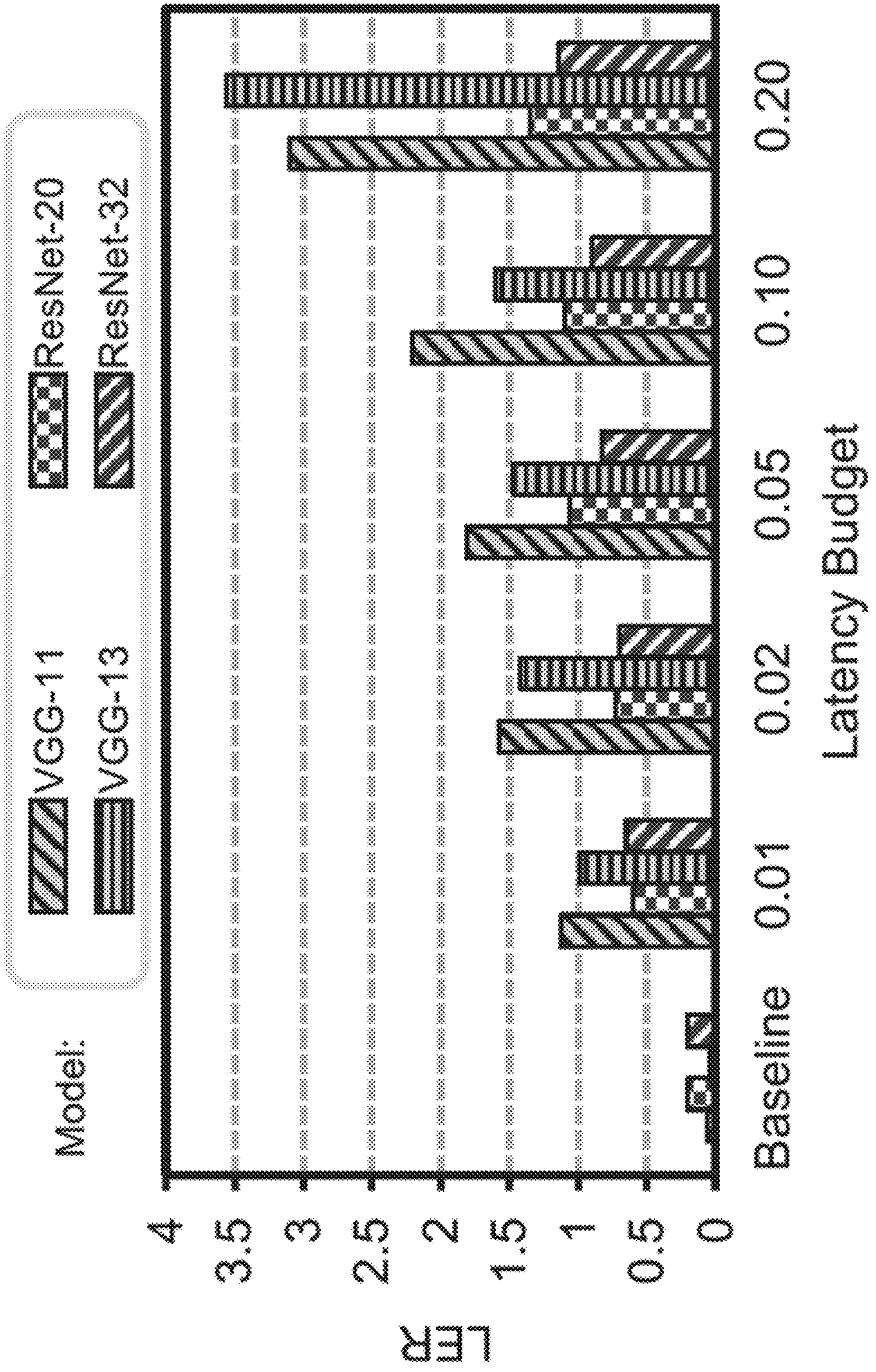
FIG. 13 is a graphical representation showing sequence obfuscation results on typical architectures on CIFAR-10 dataset including VGG-11, VGG-13, ResNet-20 and ResNet-32.

The LER results under different latency budgets are shown in FIG. 13. Notice that the LER absolute value is high for VGG-11 and VGG-13 while low for ResNet-20 and ResNet-32. This is because LER is the layer editing distance divided by total number of layers of the vanilla architecture (without obfuscation) and the sequence obfuscation affects the absolute editing distance directly rather than the relative editing distance (i.e., LER).

Figure 14:
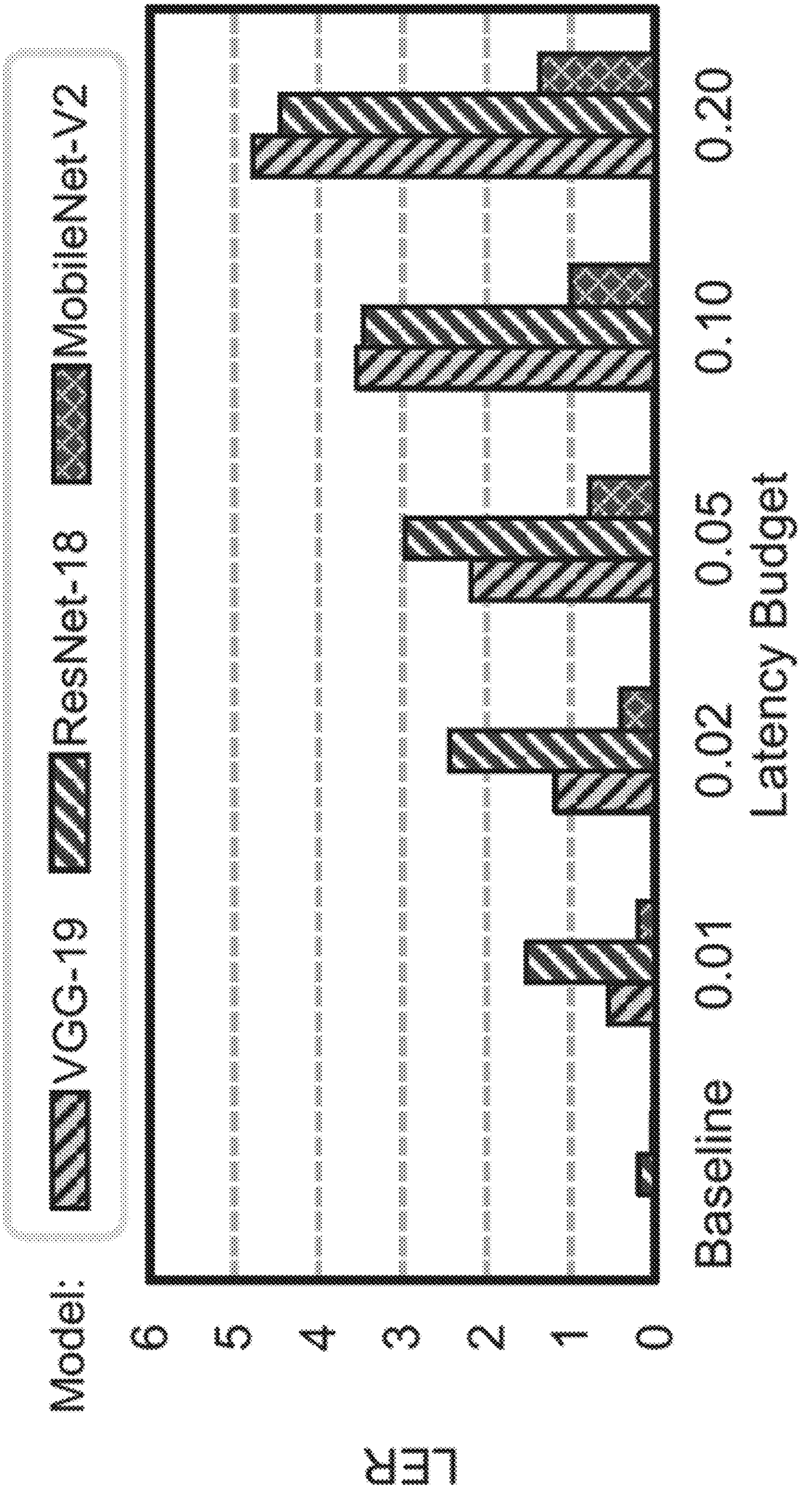
FIG. 14 is a graphical representation showing sequence obfuscation results on typical architectures on ImageNet dataset including VGG-19, ResNet-18 and MobileNet-V2.

For VGG-19, ResNet-18 and MobileNet-V2 on ImageNet dataset, Case-A and Case-B LSTM predictors struggle to get good extraction performance, i.e., provide low LER for the baseline architecture. So, bagging of three "elite" LSTM predictors was used (number of units of 128, 256, 512 LSTM predictors in Case-C), which have near-zero clean LER. The results are shown in FIG. 14. Moreover, it was observed that LER increases sub-linearly with increasing latency budget. This is because since the search space is kept fixed and the most effective knobs with low latency overhead are chosen up front, increasing the budget only allows knobs that are not as effective to get added to the obfuscation set.

Summary 1: The present disclosure demonstrates the performance of four knobs of the framework 100, namely, layer deepening, layer skipping, layer branching and selective fusion, on sequence obfuscation. While layer branching and selective fusion have relatively strong performance, combination of all four knobs by GA in the framework 100 results in the strongest performance. The framework 100 was evaluated on multiple models taking CIFAR-10 and ImageNet datasets as input data. On a ResNet-18 ImageNet model, a 2.44 LER was achieved (translates to 44 layers' difference) with a mere 2% inference latency overhead.

B. Dimension Obfuscation Performance

Figure 15A:
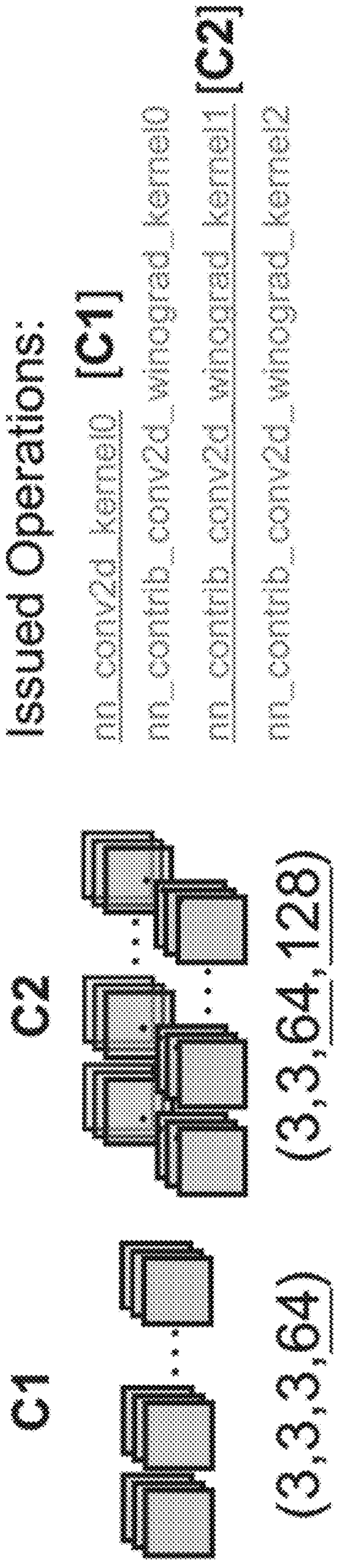
FIG. 15A is a simplified diagram showing dimension obfuscation on a Conv2D layer with 64 input channels and 128 output channels.

For dimension obfuscation, the RF regression testbed and DER metric (Eq. (10)) were used to evaluate the effect of obfuscation. A Conv2D layer (C2) was selected for a 3×3 kernel with 64 input channels and 128 output channels from VGG-19 network as an example. FIG. 15A shows the layer operators marked by sequence obfuscation. Here, C1 is the input Conv2D layer with 3 input channels and 64 output channels. In this example, the job of dimension extraction is to correctly predict the number of input channels and output channels of C2. The predictor was used to predict the output channel of C1 and input/output channel of C2. Here the ground-truth 64 is predicted twice: once as output channel of C1 and once as input channel of C2. The average is taken if the two predictions do not match. Next, the effect of individual obfuscating knobs is evaluated. The DER and latency overhead for each knob are shown in FIGS. 15B and 15C.

Layer Widening. Grid-search was used on applying widening factor of 1 to 1.5 (3/2) for C1 and C2. As shown in FIG. 15B, generally, applying higher widening factor increases the DER, and increases the latency. A sweet point was found where increasing the C1 output channel size by 1.25× can achieve a 1.20 DER with 1.04× latency.

Kernel Widening. Kernel widening affects both types of Conv2D operator. However, as shown in FIG. 15C, in most cases the large overhead makes it an expensive option to use in practice. The exception is that increasing kernel size of C1 from 3×3 to 5×5 results in 0.88 DER with 1.05× latency.

Figures 15D, 15E:
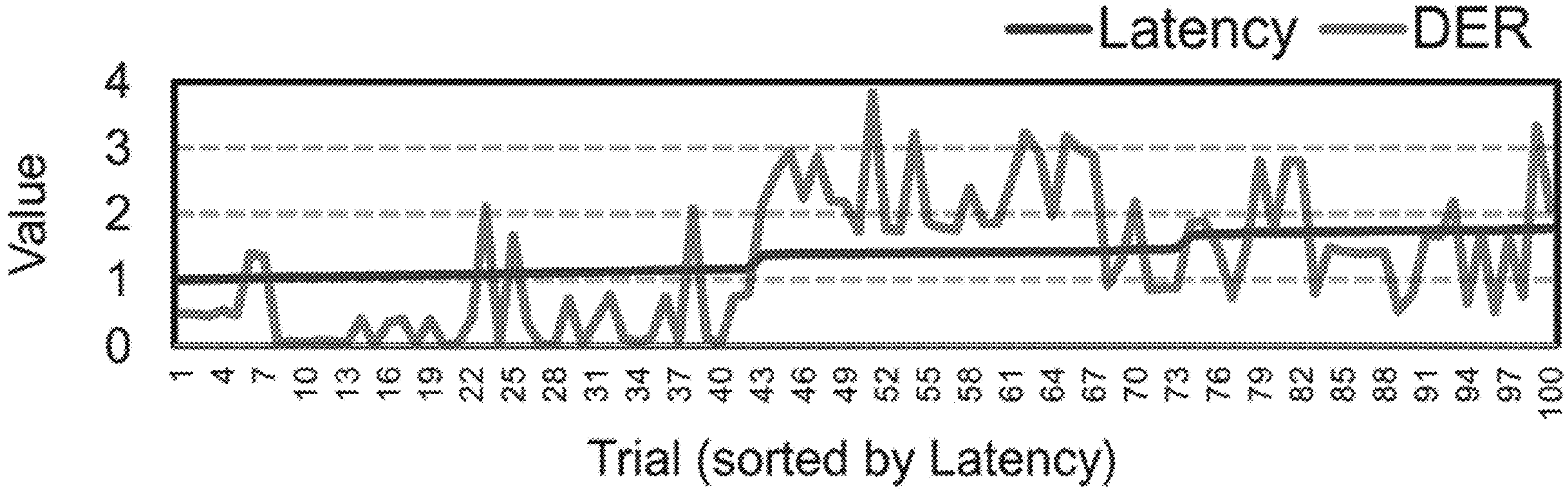
FIG. 15D is a graphical representation showing a dummy addition to only C2.
FIG. 15E is a graphical representation showing a random schedule modification resulting in highest DER for a given latency overhead.

Dummy Addition. Dummy addition does not affect the dimension parameters of C2, because dummy operator is issued after "winograd kernel2" and will not be fused into kernel1. However, for a standard Conv2D such as C1, dummy addition has a dramatic effect. As shown in FIG. 15D, DER increases with increasing dummy addition factor and reaches a sweet point when dummy addition factor is 2; the corresponding DER is 0.42 and latency is 1.04×.

Schedule Modification. For the schedule modification knob, the schedules of two templates were targeted (plain-Conv2D and winograd-Conv2D), with a total of 13 distinct tunable parameters. Since the search space is very large, 100 trials of random choices were performed. FIG. 15E plots DER as a function of increasing latency. Note that there are DER spikes (value larger than 1.0) at trials 7, 23 and 25, even when the increase in latency is 1%. Thus, schedule modification is by far the most effective knob in dimension obfuscation.

NeurObfuscator—Dimension Obfuscation. The performance of the framework 100 was evaluated on dimension parameter obfuscation. Using the same GA setting as in sequence obfuscation, and replacing the LER with DER, the results shown in Table VI were obtained. Note that final results are significantly better than when individual obfuscation knobs are used. A high DER of 2.51 is achieved with only 0.02 latency budget, i.e. a 2% increase in inference latency. This corresponds to the case where (c, j)=(64,128) is extracted to (c, j)=(207,93).

TABLE VI

| GA RESULTS FOR DIMENSION OBFUSCATION | | | | | | |
|---|---|---|---|---|---|---|
| Budget | 0.00 | 0.01 | 0.02 | 0.05 | 0.10 | 0.20 |
| DER | 0.00 | 2.05 | 2.51 | 2.80 | 3.24 | 3.43 |
| Prediction | (64, 128) | (177, 91) | (207, 93) | (225, 92) | (176, 319) | (141, 413) |

Summary 2: This disclosure demonstrates the performance of four dimension-obfuscating knobs, namely, layer widening, kernel widening, dummy addition and schedule modification. While schedule modification has the strongest performance among all four, the framework 100 achieves the best dimension obfuscation, as expected. On an example Conv2D layer with 64 input channels and 128 output channels, RF regression-based dimension extraction achieves 2.05 DER and 2.51 DER under 1% and 2% inference latency overhead, respectively.

C. Effectiveness of NeurObfuscator

The effectiveness of the proposed obfuscation techniques employed by the framework 100 were tested against various types of adversarial attacks. In particular, a methodology was adopted where a hypothetical attacker uses the extracted model (instead of using ensemble) to craft adversarial samples and use them as inputs of the target model. FGSM, PGD and targeted-PGD attacks (in which the attacker chooses the label) were performed multiple times. An average Attack Success Rate (ASR) (e.g., the percentage of samples that is transferred successfully) is reported to show the attacking performance.

Three models were selected based on VGG-11 on CIFAR-10 dataset. Model-A is the original VGG-11 architecture, Model-B is Model-A with randomly selected sequence obfuscations, and Model-C is Model-B with an additional set of dimension obfuscations. The results are shown in Table VII. Note that while all three models have comparable accuracies, models with more obfuscation results in worse attack performance. So Model-A has the highest ASR followed by Model-B followed by Model-C.

TABLE VII

OBFUSCATION PERFORMANCE AGAINST ADVERSARIAL ATTACKS

| | | Attack Success Rate | | |
|---|---|---|---|---|
| | Accuracy | PGD | PGD-targeted | FGSM |
| Model-A (vanilla) | 87.44% | 82.2% | 37.1% | 18.2% |
| Model-B (seq obf) | 87.79% | 79.1% | 34.6% | 14.4% |
| Mode-C (seq + dim obf) | 87.28% | 66.2% | 32.9% | 10.5% |

VII. Conclusions

To mitigate neural architecture stealing on GPU devices, the present disclosure describes the framework 100, which is a NN obfuscating tool that provides both sequence obfuscation and dimension obfuscation. The framework 100 uses a total of eight obfuscating knobs across scripting, optimization and scheduling phases of a neural network model execution. Application of these knobs affect the number of computations, latency and number of memory accesses, thus altering the execution trace. To achieve the best obfuscation performance for a user-defined latency overhead, the genetic algorithm is leveraged to identify the best combination of obfuscation knobs. For instance, on a ResNet-18 ImageNet model, sequence obfuscation helps achieve a 2.44 LER (which translates to 44 layers' difference) with a mere 2% latency overhead. Similarly, dimension obfuscation with 2% latency overhead for Conv2D can result in (input channel c, output channel j)=(64, 128) to get extracted to (c, j)=(207, 93). Thus, the framework 100 successfully hides the DNN model and provides a mechanism to prevent architecture stealing.

Computer-Implemented System

Figure 16:
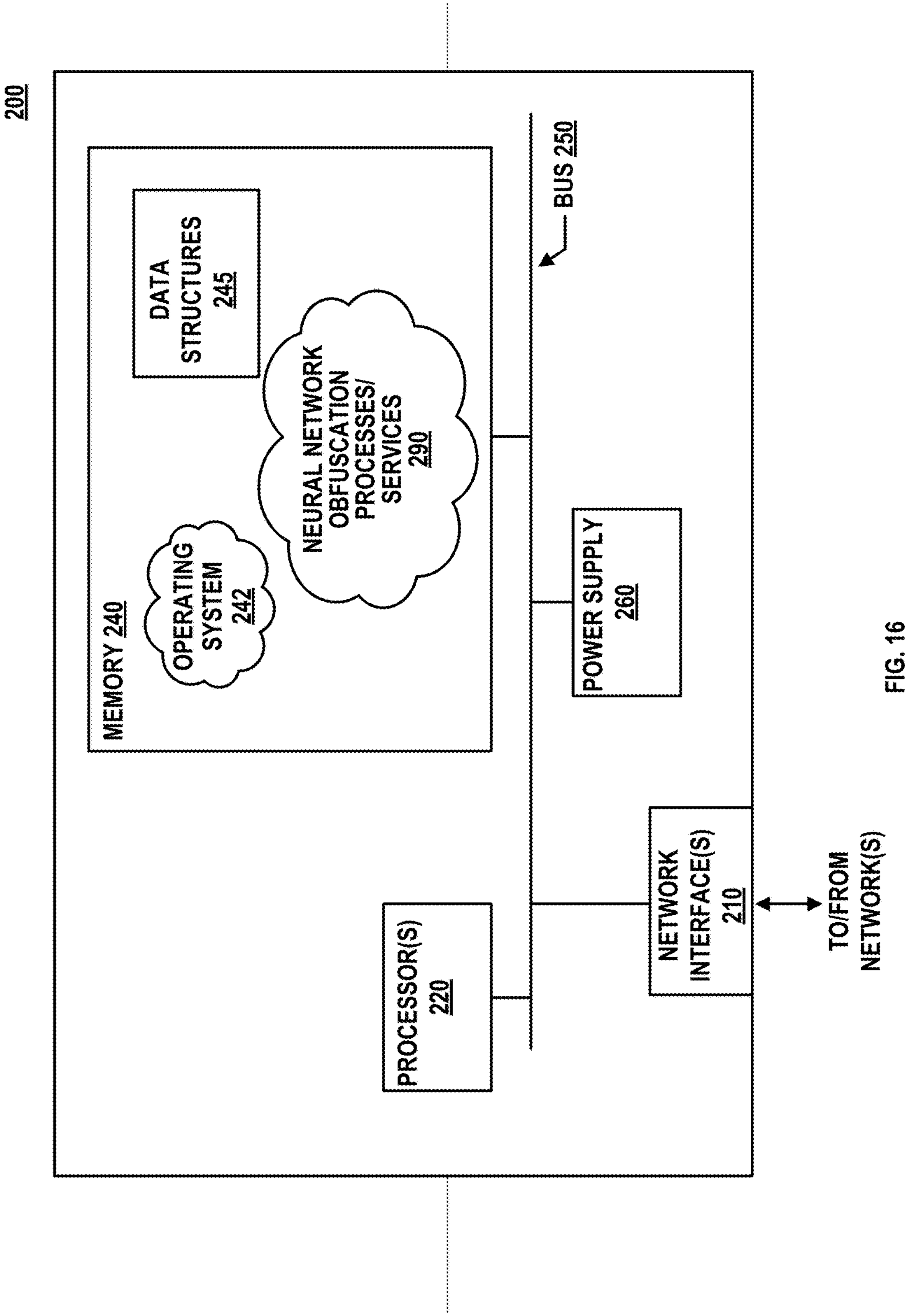
FIG. 16 is a simplified diagram showing an example computing system for implementation of the framework of FIG. 8.

FIG. 16 is a schematic block diagram of the computing device 200 that may be used with one or more embodiments described herein, e.g., as a component of framework 100.

Computing device 200 comprises one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over the communication links coupled to a communication network. Network interfaces 210 are configured to transmit and/or receive data using a variety of different communication protocols. As illustrated, the box representing network interfaces 210 is shown for simplicity, and it is appreciated that such interfaces may represent different types of network connections such as wireless and wired (physical) connections. Network interfaces 210 are shown separately from power supply 260, however it is appreciated that the interfaces that support PLC protocols may communicate through power supply 260 and/or may be an integral component coupled to power supply 260.

Memory 240 includes a plurality of storage locations that are addressable by processor 220 and network interfaces 210 for storing software programs and data structures associated with the embodiments described herein. In some embodiments, device 200 may have limited memory or no memory (e.g., no memory for storage other than for programs/processes operating on the device and associated caches).

Processor 220 comprises hardware elements or logic adapted to execute the software programs (e.g., instructions) and manipulate data structures 245. An operating system 242, portions of which are typically resident in memory 240 and executed by the processor, functionally organizes device 200 by, inter alia, invoking operations in support of software processes and/or services executing on the device. These software processes and/or services may include neural network obfuscation processes/services 290 which can include a set of instructions within the memory 240 that cause the processor 220 to implement aspects of framework 100 upon execution by the processor 220. Note that while neural network obfuscation processes/services 290 is illustrated in centralized memory 240, alternative embodiments provide for the process to be operated within the network interfaces 210, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the neural network obfuscation processes/services 290 is shown as a standalone process, those skilled in the art will appreciate that this process may be executed as a routine or module within other processes.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system for obfuscating the architecture of a neural network, comprising:
- a processor in communication with a memory, the memory including instructions, which, when executed, cause the processor to:
  - access a neural network comprising a sequence of one or more layers, each layer in the sequence of one or more layers a plurality of dimension parameters;
  - access a plurality of obfuscation parameters for obfuscating the sequence of the one or more layers and the plurality of dimension parameters;
  - obfuscate execution of the neural network, including application by the processor of a plurality of obfuscating operations to the neural network during an execution process of the neural network based on the plurality of obfuscation parameters such that an execution trace of the neural network is altered; and increase, by a kernel widening obfuscation operation in the plurality of obfuscation operations, a kernel size of one or more Conv2D layers by applying zero padding for altering the execution trace of the neural network.

2. The system of claim 1, wherein the memory includes further instructions, which, when executed, cause the processor to:

access a plurality of values for each obfuscation parameter in the plurality of obfuscation parameters;

access a time constraint for execution time of the neural network;

apply a profiling methodology to the neural network to generate a first profile;

iteratively evaluate a metric for obfuscation by:

selecting a value from the plurality of values for each obfuscation parameter, generating an obfuscated neural network from the neural network, applying the profiling methodology to the obfuscated neural network to generate a second profile, evaluating the metric for obfuscation based on the first profile and the second profile;

output an updated obfuscated neural network based on the metric for obfuscation and the time constraint for execution time.

3. The system of claim 1, wherein the execution process includes a scripting step, an optimization step, and a scheduling step.

4. The system of claim 1, the memory further including instructions, which, when executed, cause the processor to:

increase, by a layer widening obfuscation operation in the plurality of obfuscation operations, a number of input or output channels in one or more layers of the neural network for increasing a number of memory accesses in the execution trace.

5. The system of claim 1, the memory further including instructions, which, when executed, cause the processor to:

increase, by a layer branching obfuscation operation in the plurality of obfuscation operations, a number of layer operators in the neural network for changing a volume of data accessed in the execution trace.

6. The system of claim 1, the memory further including instructions, which, when executed, cause the processor to:

apply, by a dummy addition obfuscation operation in the plurality of obfuscation operations one or more additive identity operations to an output of one or more layers in the neural network for increasing a number of cache accesses by the execution trace.

7. The system of claim 1, the memory further including instructions, which, when executed, cause the processor to:

insert, by a layer deepening obfuscation operation in the plurality of obfuscation operations, one or more computational layers in series with one or more existing layers in the neural network for increasing a number of computations in the execution trace.

8. The system of claim 1, the memory further including instructions, which, when executed, cause the processor to:

insert, by a layer skipping obfuscation operation in the plurality of obfuscation operations, one or more computational layers in parallel to one or more existing layers in the neural network for increasing a number of computations in the execution trace.

9. The system of claim 1, the memory further including instructions, which, when executed, cause the processor to:

apply, at the processor, a selective fusion obfuscation operation in the plurality of obfuscation operations to fuse one or more successive operators.

10. The system of claim 1, the memory further including instructions, which, when executed, cause the processor to:

apply, at the processor, a schedule modification obfuscation operation in the plurality of obfuscation operations, to generate a plurality of different schedules for an operator of the neural network.

11. A method for neural network obfuscation, comprising:

accessing, at a processor, a neural network model;

applying, at the processor, an initial profiling methodology on the neural network model;

applying, at the processor, a plurality of obfuscating operations during an execution process of the neural network model, wherein the execution process includes a scripting step, an optimization step, and a scheduling step, including applying, at the processor, a set of obfuscation knobs during the scripting step of the execution process that collectively obfuscate a layer sequence of the neural network model and dimensions of one or more layer operators of the neural network model, and increasing, by a layer widening knob of the set of obfuscation knobs at the processor, memory access for a current layer of the neural network model and a next layer of the neural network model by (N−1) times for a widening factor N; and generating, at the processor, an obfuscated neural network model based on the neural network model following the execution process of the neural network model such that one or more properties of the obfuscated neural network model are obfuscated with respect to the neural network model.

12. The method of claim 11, further comprising:

increase, by a layer branching knob of the set of obfuscation knobs at the processor, a number of layer operators of the neural network model that changes a data volume accessed for each respective layer operator of the neural network model.

13. The method of claim 11, further comprising:

applying, by a dummy addition knob of the set of obfuscation knobs at the processor, a zero matrix having dimensions that match an activation output of a current layer of the neural network model.

14. The method of claim 11, further comprising:

inserting, by a layer deepening knob of the set of obfuscation knobs at the processor, a deepening layer at an end of an activation function of a current layer of the neural network model.

15. The method of claim 11, further comprising:

inserting, by a layer skipping knob of the set of obfuscation knobs at the processor, a skipping layer at an activation output of an existing layer of the neural network model; and adding, at the processor, an output of the skipping layer to the activation output of the existing layer.

16. A method for neural network obfuscation, comprising:

accessing, at a processor, a neural network model;

applying, at the processor, an initial profiling methodology on the neural network model;

applying, at the processor, a plurality of obfuscating operations during an execution process of the neural network model, wherein the execution process includes a scripting step, an optimization step, and a scheduling step, including applying, at the processor, a set of obfuscation knobs during the scripting step of the execution process that collectively obfuscate a layer sequence of the neural network model and dimensions of one or more layer operators of the neural network model;

generating, at the processor, an obfuscated neural network model based on the neural network model following the execution process of the neural network model such that one or more properties of the obfuscated neural network model are obfuscated with respect to the neural network model; and altering, at a kernel widening knob of the set of obfuscation knobs at the processor, a kernel size of a Conv2D operator of the neural network model resulting in a modified trace of the neural network model.

* * * * *